(12) United States Patent
Saito et al.

(10) Patent No.: US 8,489,862 B2
(45) Date of Patent: Jul. 16, 2013

(54) MULTIPROCESSOR CONTROL APPARATUS FOR CONTROLLING A PLURALITY OF PROCESSORS SHARING A MEMORY AND AN INTERNAL BUS AND MULTIPROCESSOR CONTROL METHOD AND MULTIPROCESSOR CONTROL CIRCUIT FOR PERFORMING THE SAME

(75) Inventors: Masahiko Saito, Kanagawa (JP); Masashige Mizuyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 814 days.

(21) Appl. No.: 12/663,932

(22) PCT Filed: Jun. 5, 2008

(86) PCT No.: PCT/JP2008/001438
§ 371 (c)(1),
(2), (4) Date: Dec. 10, 2009

(87) PCT Pub. No.: WO2008/152790
PCT Pub. Date: Dec. 18, 2008

(65) Prior Publication Data
US 2010/0185833 A1    Jul. 22, 2010

(30) Foreign Application Priority Data

Jun. 12, 2007   (JP) .................................. 2007-154774

(51) Int. Cl.
*G06F 15/00* (2006.01)
*G06F 15/76* (2006.01)

(52) U.S. Cl.
USPC ............................................ 712/43; 712/220

(58) Field of Classification Search
None
See application file for complete search history.

(56) References Cited

U.S. PATENT DOCUMENTS 5,995,745 A    11/1999   Yodaiken
7,257,678 B2    8/2007   Golden et al.
(Continued)

FOREIGN PATENT DOCUMENTS

EP    1 727 022    11/2006
JP    62-139046    6/1987
(Continued)

OTHER PUBLICATIONS

International Search Report issued Aug. 26, 2008 in International (PCT) Application No. PCT/JP2008/001438.
(Continued)

*Primary Examiner* — Andrew Caldwell
*Assistant Examiner* — George Giroux
(74) *Attorney, Agent, or Firm* — Wenderoth, Lind & Ponack, L.L.P.

(57) ABSTRACT

An object of the invention is to reduce the electric power consumption resulting from temporarily activating a processor requiring a large electric power consumption, out of a plurality of processors. A multiprocessor system (1) includes: a first processor (141) which executes a first instruction code; a second processor (151) which executes a second instruction code, a hypervisor (130) which converts the second instruction code into an instruction code executable by the first processor (141); and a power control circuit (170) which controls the operation of at least one of the first processor (141) and the second processor (151). When the operation of the second processor (151) is suppressed by the power control circuit (170), the hypervisor (130) converts the second instruction code into the instruction code executable by the first processor (141), and the first processor (141) executes the converted instruction code.

13 Claims, 19 Drawing Sheets

U.S. PATENT DOCUMENTS

| | | | |
|---|---|---|---|
| 2005/0005073 | A1 | 1/2005 | Pruvost et al. |
| 2005/0055192 | A1* | 3/2005 | Traut .............................. 703/20 |
| 2005/0132239 | A1 | 6/2005 | Athas et al. |
| 2006/0075192 | A1 | 4/2006 | Golden et al. |
| 2006/0271797 | A1 | 11/2006 | Ginggen et al. |
| 2007/0006178 | A1* | 1/2007 | Tan .............................. 717/136 |
| 2007/0079150 | A1* | 4/2007 | Belmont et al. ............. 713/300 |
| 2007/0113227 | A1* | 5/2007 | Oney et al. ....................... 718/1 |
| 2007/0143763 | A1 | 6/2007 | Adachi et al. |
| 2008/0052504 | A1* | 2/2008 | Tsuji et al. ........................ 713/1 |
| 2009/0138739 | A1 | 5/2009 | Ginggen et al. |

FOREIGN PATENT DOCUMENTS

| | | |
|---|---|---|
| JP | 62-274455 | 11/1987 |
| JP | 4-191946 | 7/1992 |
| JP | 5-197577 | 8/1993 |
| JP | 5-66627 | 9/1993 |
| JP | 7-13787 | 1/1995 |
| JP | 2000-242512 | 9/2000 |
| JP | 2001-92661 | 4/2001 |
| JP | 2005-25726 | 1/2005 |
| JP | 2006-11548 | 1/2006 |
| WO | 2006/039153 | 4/2006 |

OTHER PUBLICATIONS

Norman P. Jouppi, "Improving Direct-Mapped Cache Performance by the Addition of a Small Fully-Associative Cache and Prefetch Buffers", 1990 Proceedings, IEEE 17$^{th}$ Annual International Symposium on Computer Architecture, May 31, 1990, pp. 364-373.

Supplementary European Search Report issued Jun. 7, 2011 in Application No. EP 08 76 4035.

Gerry Kane, "MIPS RISC Architecture", Kyoritsu Shuppan Co., Ltd., Oct. 1, 1992, first edition, pp. 80-81 (with partial English translation).

Robert L. Hummel, "80×86 / 80×87 Family Technical Handbook", Gijutsu Hyoron Co., Ltd., Oct. 28, 1993, first edition, pp. 147 (with partial English translation).

* cited by examiner

FIG.5

| INSTRUCTION CODE BY SECOND PROCESSOR (201) | INSTRUCTION CODE GROUP BY FIRST PROCESSOR (202) |
|---|---|
| add64 r0-r1,r2-r3,r4-r5<br>#RESULT LOWER 32bit:r0,HIGHER 32bit:r1<br>#AUGEND LOWER 32bit:r2,HIGHER 32bit:r3<br>#ADDEND LOWER 32bit:r4,HIGHER 32bit:r5 | add32  r0,r2,r4   #ADD LOWER 32bit<br>addc32 r1,r3,r5  #ADD HIGHER 32bit WITH CARRY |
| sub64 r0-r1,r2-r3,r4-r5<br>#RESULT LOWER 32bit:r0,HIGHER 32bit:r1<br>#MINUEND LOWER 32bit:r2,HIGHER 32bit:r3<br>#SUBTRAHEND LOWER 32bit:r4,HIGHER 32bit:r5 | sub32  r0,r2,r4   #SUBTRACT LOWER 32bit<br>subc32 r1,r3,r5  #SUBTRACT HIGHER 32bit WITH CARRY |
| mul64 r0-r1,r2-r3,r4-r5<br>#RESULT LOWER 32bit:r0,HIGHER 32bit:r1<br>#MULTIPLICAND LOWER 32bit:r2,HIGHER 32bit:r3<br>#MULTIPLIER LOWER 32bit:r4,HIGHER 32bit:r5 | push  r6,r7,r8,r9   #SAVE WORK REGISTER<br>mul32  r0-r1,r2,r4   #MULTIPLY LOWER 32bit<br>                                   #RESULT HIGHER 32bit:r0,LOWER 32bit:r1<br>mul32  r6-r7,r2,r5   #MULTIPLY LOWER 32bit BY HIGHER 32 bit<br>                                   #RESULT LOWER 32bit:r6,HIGHER 32bit:r7<br>mul32  r8-r9,r3,r4   #MULTIPLY LOWER 32bit BY HIGHER 32 bit<br>                                   #RESULT LOWER 32bit:r8,HIGHER 32bit:r9<br>add32  r1,r1,r6      #ADD BY HIGHER 32bit<br>add32  r1,r1,r8      #ADD BY HIGHER 32bit<br>pop    r6,r7,r8,r9   #RESTORE WORK REGISTER |
| ... | ... |

200

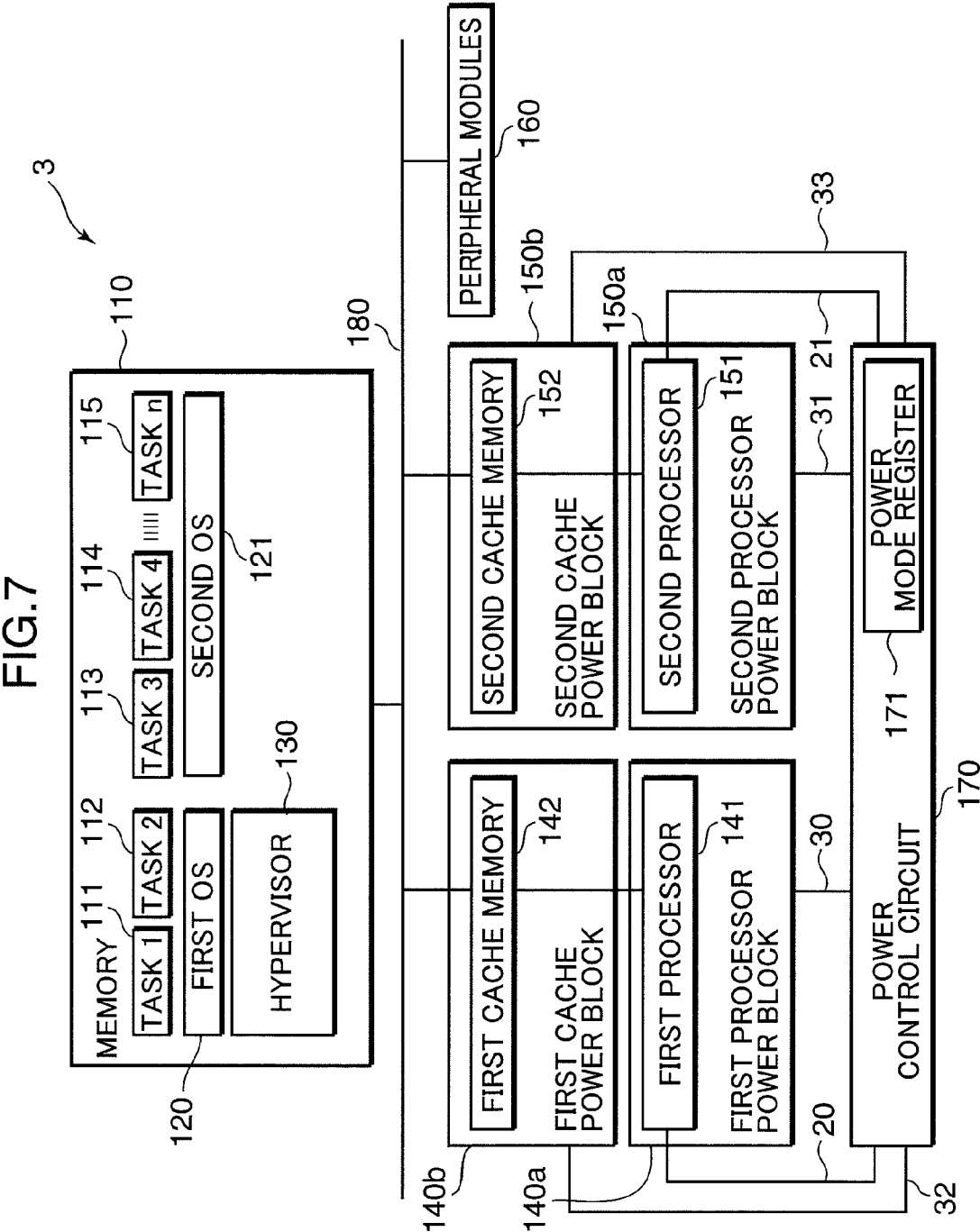

FIG.8

| 211 | 212 | 213 | 214 |
|---|---|---|---|
| POWER MODE | ELECTRIC POWER SUPPLY TARGET | CLOCK SIGNAL SUPPLY TARGET | HYPERVISOR |
| SHUTDOWN MODE | NONE | NONE | NOT OPERATED |
| STANDBY MODE | FIRST CACHE MEMORY | NONE | NOT OPERATED |
| POWER SAVING OPERATION MODE | FIRST PROCESSOR AND FIRST CACHE MEMORY | FIRST PROCESSOR AND FIRST CACHE MEMORY | EMULATION OPERATION |
| HIGH-SPEED STANDBY MODE | FIRST PROCESSOR, FIRST CACHE MEMORY, AND SECOND CACHE MEMORY | FIRST PROCESSOR AND FIRST CACHE MEMORY | EMULATION OPERATION |
| HIGH-SPEED OPERATION MODE | FIRST PROCESSOR, SECOND PROCESSOR, FIRST CACHE MEMORY AND SECOND CACHE MEMORY | FIRST PROCESSOR, SECOND PROCESSOR, FIRST CACHE MEMORY AND SECOND CACHE MEMORY | NOT OPERATED, OR OPERATED (EXCEPT FOR EMULATION) |

210

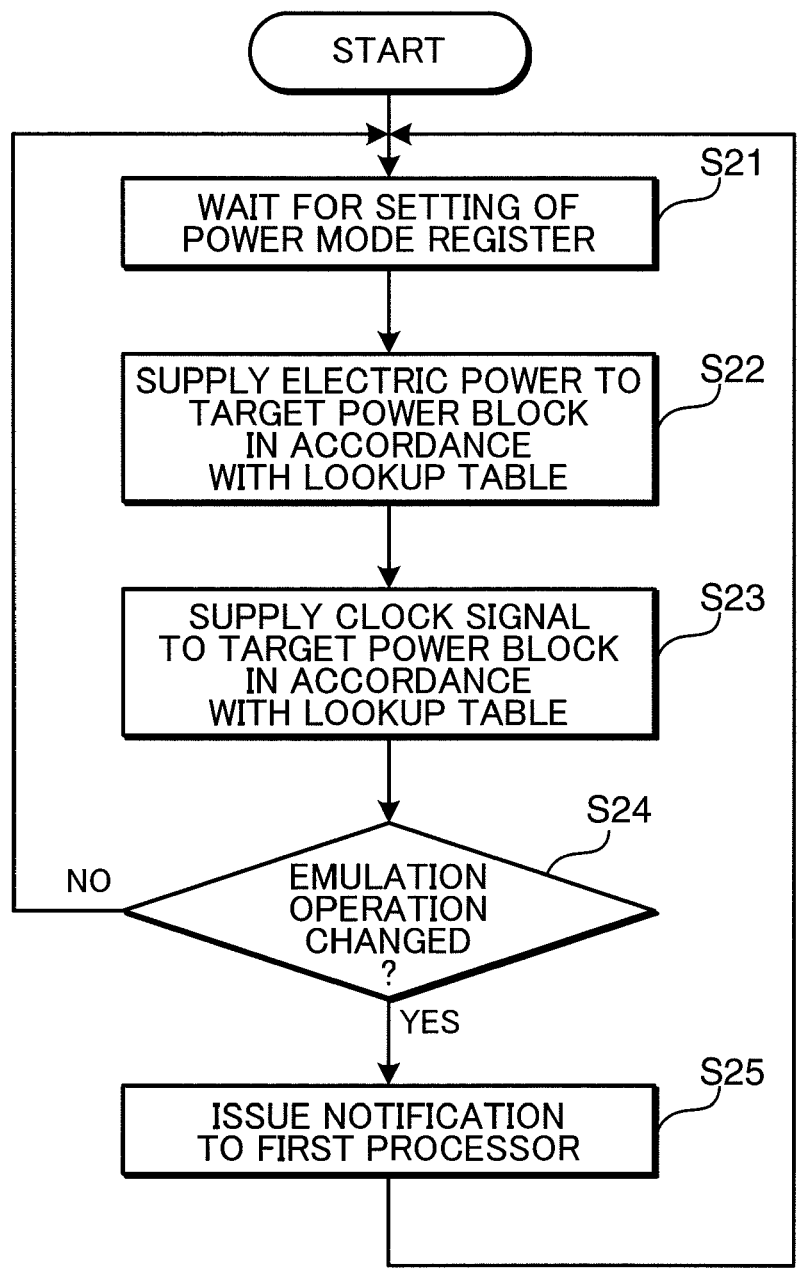

FIG.11

| INTERRUPTION REQUEST SOURCE INFORMATION ~221 | INTERRUPTION TARGET INFORMATION ~222 |
|---|---|
| SERIAL COMMUNICATIONS | FIRST PROCESSOR |
| DISPLAY INDICATION | SECOND PROCESSOR |
| IMAGE PROCESSING | SECOND PROCESSOR |
| NETWORK DEVICE | FIRST PROCESSOR |
| ... | ... |

| POWER MODE | PROCESSOR IN INTERRUPTION LOOKUP TABLE (231) | PROCESSOR TO BE NOTIFIED BY DEMULTIPLEXER (232) | OPERATION OF INTERRUPTION TIME CONTROL CIRCUIT (234) |
|---|---|---|---|
| SHUTDOWN MODE | FIRST PROCESSOR | FIRST PROCESSOR | WAITING FOR STABILIZATION OF FIRST PROCESSOR |
| | SECOND PROCESSOR | FIRST PROCESSOR | WAITING FOR STABILIZATION OF FIRST PROCESSOR + WAITING FOR ACTIVATION OF HYPERVISOR |
| STANDBY MODE | FIRST PROCESSOR | FIRST PROCESSOR | WAITING FOR STABILIZATION OF FIRST PROCESSOR |
| | SECOND PROCESSOR | FIRST PROCESSOR | WAITING FOR STABILIZATION OF FIRST PROCESSOR + WAITING FOR ACTIVATION OF HYPERVISOR |
| POWER SAVING OPERATION MODE | FIRST PROCESSOR | FIRST PROCESSOR | IMMEDIATE INTERRUPTION NOTIFICATION |
| | SECOND PROCESSOR | FIRST PROCESSOR | WAITING FOR ACTIVATING OF HYPERVISOR |
| HIGH-SPEED STANDBY MODE | FIRST PROCESSOR | FIRST PROCESSOR | IMMEDIATE INTERRUPTION NOTIFICATION |
| | SECOND PROCESSOR | SECOND PROCESSOR | WAITING FOR STABILIZATION OF SECOND PROCESSOR + WAITING FOR DATA TRANSFER BETWEEN CACHE MEMORIES |
| HIGH-SPEED OPERATION MODE | FIRST PROCESSOR | FIRST PROCESSOR | IMMEDIATE INTERRUPTION NOTIFICATION |
| | SECOND PROCESSOR | SECOND PROCESSOR | IMMEDIATE INTERRUPTION NOTIFICATION |

230

MULTIPROCESSOR CONTROL APPARATUS FOR CONTROLLING A PLURALITY OF PROCESSORS SHARING A MEMORY AND AN INTERNAL BUS AND MULTIPROCESSOR CONTROL METHOD AND MULTIPROCESSOR CONTROL CIRCUIT FOR PERFORMING THE SAME

TECHNICAL FIELD

The present invention relates to a multiprocessor control apparatus, a multiprocessor control method, and a multiprocessor control circuit for controlling a plurality of processors sharing a memory and an internal bus, and more particularly to a multiprocessor system including a plurality of processors sharing a memory, a system LSI (Large Scale Integration) including a plurality of processor cores sharing an internal bus, a multiprocessor control apparatus, a multiprocessor control method, and a multiprocessor control circuit for controlling an electric power to be supplied to processors in these systems.

BACKGROUND ART

Multitudes of multiprocessor systems including a plurality of processors sharing a memory have been applied in various industrial fields. As a recent technical trend of system LSI, there is actively used a multi-core architecture loaded with a plurality of processor cores. Particularly, in an embedded system LSI, it is often advantageous to load a plurality of processor cores of medium scale or smaller, rather than loading one ultra-high speed processor core, in the aspect of cost, electric power consumption, and the like.

For instance, patent literature 1 and patent literature 2 disclose methods, wherein a plurality of identical processors are loaded, and the number of processors to be operated is determined depending on a load or a calorific value required in executing a program, as an electric power consumption reduction technology in a multiprocessor system and a multi-core LSI loaded with a plurality of processors (hereinafter, "a processor" and "a processor core" are generically called as a "processor").

In patent literature 1, an input command is decoded, and in the case where the number of computations to be executed in parallel is smaller than the number of processors, an operational clock signal of a processor in an inoperative state is suspended. Thereby, unwanted electric power consumption is suppressed, as necessary.

On the other hand, patent literature 2 discloses a method, wherein the degree of parallel use of a plurality of processors provided in a multiprocessor system and a multi-core LSI is switched depending on a temperature. In patent literature 2, the number of processors to be operated is determined so that a required calorific value is equal to or smaller than a predetermined calorific value. A calorific value may be interpreted as an electric power consumption. Thus, programs can always be run in parallel in a predetermined electric power consumption range.

Patent literature 3 discloses a method, wherein different processors (a main processor and a sub processor) are prepared to allocate programs by function distribution, and some of the programs are run only by the sub processor during a power saving operation time. Only in a condition that a program which is not allocated to the sub processor is required to be run e.g. a sophisticated error correcting process is performed, an electric power is supplied to the main processor to allow the main processor to execute the process. This enables to shorten an operation time of the main processor, thereby reducing the electric power consumption.

In a mobile-embedded computing system as represented by e.g. a mobile phone and a mobile terminal, electric power consumption reduction is an important issue, as well as enhancing the function and the performance of the system. Particularly, as described above, in an embedded system LSI, a multi-core architecture loaded with a plurality of processor cores of medium scale or smaller is selected, rather than loading one ultra-high speed processor core, in the aspect of cost, electric power consumption, and the like.

As recited in patent literature 1 and patent literature 2, normally, in a multiprocessor system or a multi-core LSI called as VLIW (Very Long Instruction Word) or SMP (Symmetric Multi Processor), a plurality of identical processors are prepared, and the number of processors to be operated is determined depending on the degree of parallelism of programs. In this arrangement, preparing a large number of (ten or more) low-performance processors only results in increasing the overhead. There is an increasing demand for loading several (two to four) processors of medium scale or larger in the aspect of performance. Accordingly, even if a load of a program to be executed is reduced, and electric power supply to the processors other than one processor is suspended, since the electric power consumption of the one processor is relatively high, a required electric power consumption is increased to some extent.

In a homogeneous architecture such as VLIW and SMP, any one of the programs may be executed by any one of the processors. Therefore, there should be no difference in e.g. instruction set and memory map between the processors. For instance, it is difficult to apply a low-power consumption processor architecture to only a processor or processors which should be kept in an operated state. On the other hand, in the case where there is a difference between the processors, it is necessary to determine in advance which program, out of a plurality of programs, is to be run on which processor. Patent literature 3 recites an electric power consumption reduction technology to be applied in the case where processors are not homogeneous.

In the case where the technology recited in patent literature 3 is used, only the sub processor is operated during a power saving operation time. Accordingly, selecting a relatively low-performance and low-power consumption processor architecture as the sub processor enables to reduce the electric power consumption during a power saving operation time, as compared with the technologies recited in patent literature 1 and patent literature 2. The technology recited in patent literature 3 is a technology capable of reducing the electric power consumption during a power saving operation time by allocating a program to be mainly executed during the power saving operation time to the sub processor, and allocating a program to be run at a high speed to the high-performance main processor.

There is a case, however, that a program allocated to the main processor is required to be operated even in a power saving operation time due to an influence of e.g. an external event. In this case, a control flow of supplying an electric power to the high-performance main processor, waiting for stabilization, executing a program, and cutting off the electric power supply is necessary, which may fail to achieve electric power consumption reduction, as expected. In particular, a program which should be run during a power saving operation time, and should be quickly started up in a high-speed operation time, is required to be loaded in the high-performance main processor, which hinders the electric power consumption reduction.

In the following, a clock display process to be executed in e.g. a mobile phone is described. In a recently-available mobile phone, as Java (registered trademark) and a browsing software are loaded, and various functions are developed, a high-speed screen rendering process is required. If an architecture provided with heterogeneous processors as described above is employed, generally, a screen rendering process is allocated to a high-performance main processor. However, in executing the clock display process, the screen rendering process is required to be executed periodically (every one second or every one minute), even if the mobile phone is in a call wait state (a state that no manipulation is conducted). In other words, it is necessary to periodically activate the high-performance main processor, even in a condition that the call wait state is continued for a long time. This may lower the electric power consumption reducing effect.

patent literature 1: JP 2001-92661A (pages 4 through 11, FIGS. 1 through 12)

patent literature 2: JP2006-11548A (pages 6 through 13, FIGS. 1 through 12)

patent literature 3; JP Hei 7-13787A (pages 3 through 4, FIGS. 1 through 3)

DISCLOSURE OF THE INVENTION

In view of the above, it is an object of the present invention to provide a multiprocessor control apparatus, a multiprocessor control method, and a multiprocessor control circuit that enable to reduce the electric power consumption resulting from temporarily activating a processor requiring a large electric power consumption out of a plurality of processors.

A multiprocessor control apparatus according to an aspect of the invention includes: a first processor which executes a first instruction code; a second processor which executes a second instruction code different from the first instruction code; an instruction converting section which converts the second instruction code into an instruction code executable by the first processor; and a control section which controls an operation of at least one of the first processor and the second processor, wherein the instruction converting section converts the second instruction code into an instruction code executable by the first processor, in the case where the operation of the second processor is suppressed by the control section, and the first processor executes the converted instruction code.

A multiprocessor control method according to another aspect of the invention is a multiprocessor control method for controlling a first processor which executes a first instruction code, and a second processor which executes a second instruction code different from the first instruction code. The multiprocessor control method includes: a control step of controlling an operation of at least one of the first processor and the second processor; an instruction converting step of converting the second instruction code into an instruction code executable by the first processor, in the case where the operation of the second processor is suppressed in the control step; and an executing step of executing the instruction code converted in the instruction converting step by the first processor.

A multiprocessor control circuit according to yet another aspect of the invention is a multiprocessor control circuit for controlling a first processor which executes a first instruction code, and a second processor which executes a second instruction code different from the first instruction code. The multiprocessor control circuit includes: an instruction converting circuit which converts the second instruction code into an instruction code executable by the first processor; and a control circuit which controls an operation of at least one of the first processor and the second processor, wherein the instruction converting circuit converts the second instruction code into an instruction code executable by the first processor, in the case where the operation of the second processor is suppressed by the control circuit, and the first processor executes the converted instruction code.

According to the above arrangements, even if the second instruction code to be run on the second processor is fetched during a time when the operation of the second processor is suppressed, the second instruction code can be converted into the instruction code executable by the first processor, and the converted instruction code can be run on the first processor, without activating the second processor.

The arrangements of the invention enable to reduce the number of times of temporarily activating the second processor during the time when the operation of the second processor is suppressed, and reduce the electric power consumption resulting from temporarily activating a processor requiring a large electric power consumption, out of a plurality of processors.

These and other objects, features and advantages of the present invention will become more apparent upon reading the following detailed description along with the accompanying drawings.

BRIEF DESCRIPTION OF THE DRAWINGS

FIG. 5 is a diagram for describing an example of a conversion table to be used by the hypervisor in the first embodiment.

FIG. 7 is a diagram showing an example of a configuration of a multiprocessor system in a second embodiment of the invention.

FIG. 8 is a diagram showing an example of a lookup table showing objects to be operated corresponding to power modes settable by a power mode register, and operation contents of the hypervisor.

FIG. 9 is a flowchart for describing an example of an operation to be executed by a power control circuit in the second embodiment.

FIG. 11 is a diagram showing an example of an interruption lookup table to be used in the third embodiment.

FIG. 12 is a diagram showing an example of an operation lookup table showing operation contents based on the power mode register and the interruption lookup table.

BEST MODE FOR CARRYING OUT THE INVENTION

In the following, embodiments of the invention are described referring to the accompanying drawings. The following embodiments are merely some examples embodying the invention, and do not limit the technical scope of the invention.

First Embodiment

Figure 1:
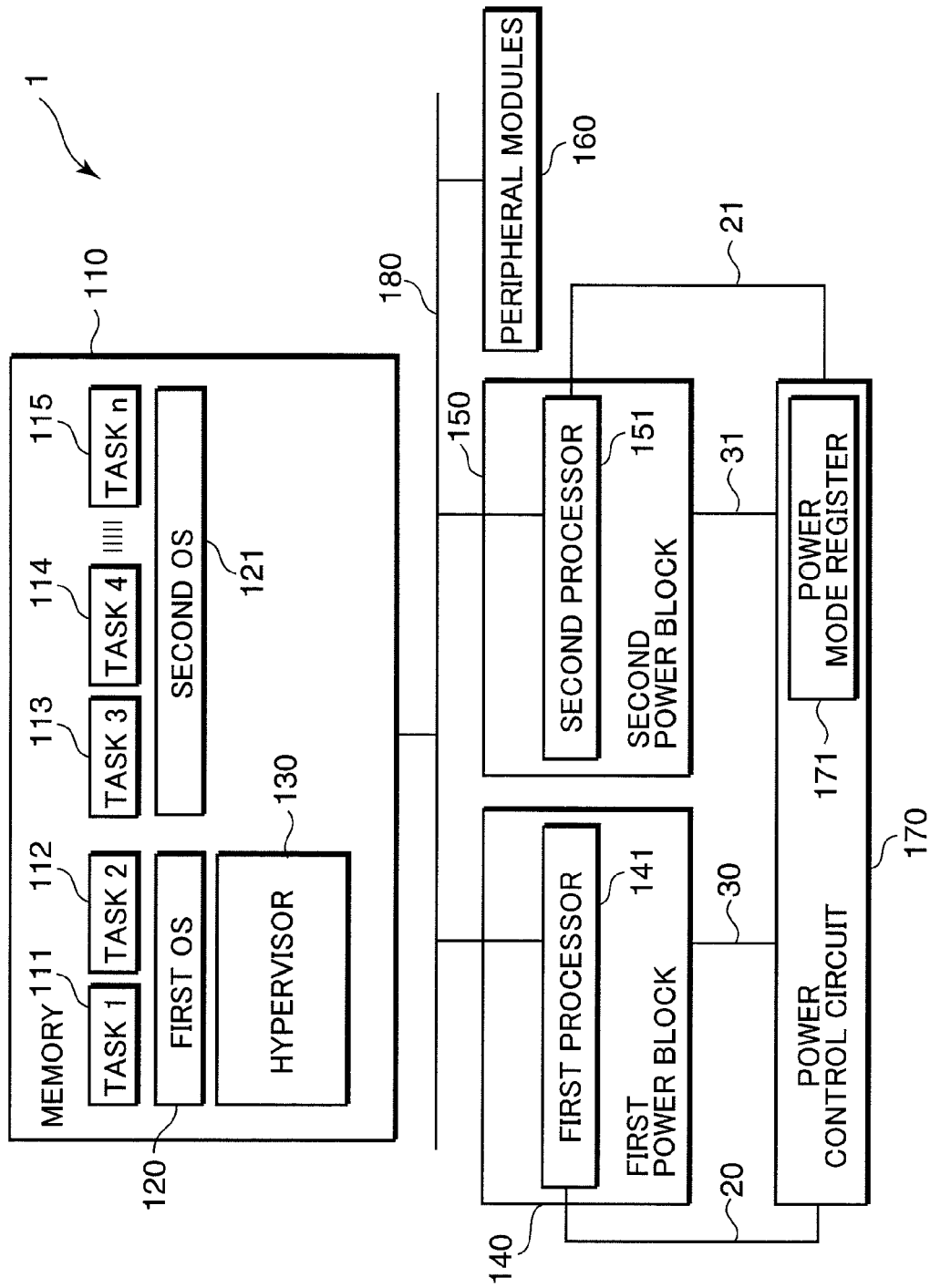
FIG. 1 is a diagram showing an example of a concrete configuration of a multiprocessor system in a first embodiment of the invention.

FIG. 1 is a diagram showing an example of a concrete configuration of a multiprocessor control apparatus (hereinafter, called as a multiprocessor system) in the first embodiment of the invention.

Referring to FIG. 1, the multiprocessor system 1 in this embodiment includes an internal bus 180, a memory 110 to be connected to the internal bus 180, a first processor 141 which executes an instruction code stored in the memory 110, a second processor 151 which executes an instruction code stored in the memory 110, a power control circuit 170, and peripheral modules 160 to be connected to the internal bus 180.

In this embodiment, the first processor 141 is a processor (hereinafter, called as a "low-power consumption processor") having a lower performance and a smaller electric power consumption than those of the second processor 151. The second processor 151 is a processor (hereinafter, called as a "high-performance processor") having a higher performance and a larger electric power consumption than those of the first processor 141. In other words, the electric power to be consumed by the low-power consumption processor 141 is smaller than the electric power to be consumed by the high-performance processor 151.

For instance, the first processor 151 is a processor which executes a process mainly relating to communications, and the second processor 151 is a processor which executes a process mainly relating to applications such as a user interface. The multiprocessor system 1 in this embodiment is loaded in e.g. a mobile phone, a digital video camera, a digital still camera, or a PDA (Personal Digital Assistant).

The power control circuit 170 corresponds to an example of a control section and an electric power control section, and controls an operation of at least one of the low-power consumption processor 141 and the high-performance processor 151. Specifically, the power control circuit 170 controls an electric power to be supplied from a power source to the low-power consumption processor 141 and the high-performance processor 151. The power control circuit 170 is a hardware module which controls supply of an electric power from the power source (not shown) to a first power block 140 and/or a second power block 150, which will be described later, in accordance with a request from the low-power consumption processor 141 or the high-performance processor 151.

The power control circuit 170 suspends supply of an electric power to the high-performance processor 151, in the case where supply of the electric power to the high-performance processor 151 is suppressed.

The power control circuit 170 has a power mode register 171, as a register which stores information (power modes) indicating a current electric power supply state from the power source. The power modes include e.g. a high-speed operation mode of supplying an electric power to both of the first power block 140 and the second power block 150, and a power saving operation mode of supplying an electric power to the first power block 140, and suspending supply of an electric power to the second power block 150. The power mode register 171 stores values corresponding to the power modes such as the high-speed operation mode and the power saving operation mode.

In this section, an operation as to how the multiprocessor system 1 is shifted between the power saving operation mode and the high-speed operation mode is described. The power control circuit 170 receives a signal to be transmitted from the low-power consumption processor 141 to the power control circuit 170 through a control signal line 20 e.g. a signal requesting switching from the power saving operation mode to the high-speed operation mode; or a signal to be transmitted from the high-performance processor 151 to the power control circuit 170 through a control signal line 21 e.g. a signal requesting switching from the high-speed operation mode to the power saving operation mode. The power control circuit 170 switches the power mode stored in the power mode register 171, based on a signal received from the low-power consumption processor 141 or the high-performance processor 151. Then, the power control circuit 170 supplies an electric power in accordance with the switched power mode to the first power block 140 and/or the second power block 150.

In this example, the power blocks each indicates a range, in which the electric power is supplied from the power control circuit 170, in terms of blocks. The first power block 140 includes the first processor 141, and the second power block 150 includes the second processor 151. In the example shown in FIG. 1, in response to switching of electric power supply to the first power block 140 through an electric power supply line 30 by the power control circuit 170, the electric power to be supplied to the low-power consumption processor 141 is changed, and in response to switching of electric power supply to the second power block 150 through an electric power supply line 31 by the power control circuit 170, the electric power to be supplied to the high-performance processor 151 is changed.

In this example, it should be noted that a control method to be used in switching the power mode between the power saving operation mode and the high-speed operation mode is not limited to a method for switching on and off a power source voltage. As a modification, the power control circuit 170 supplies a clock signal only to the low-power consumption processor 141, and suspends supply of a clock signal to the high-performance processor 151 in the power saving operation mode; and supplies a clock signal to both of the low-power consumption processor 141 and the high-performance processor 151 in the high-speed operation mode. This enables to switch the power mode between the power saving operation mode and the high-speed operation mode, without changing the power source voltage.

As another modification, the power control circuit 170 shifts the high-performance processor 151 to an interruption wait state in the power saving operation mode, without changing supply of a power source voltage and a clock signal, and returns the high-performance processor 151 to a normal operation state in the high-speed operation mode. This enables to switch the power mode between the power saving operation mode and the high-speed operation mode, without changing supply of a power source voltage and a clock signal.

Normally, in executing on/off control of a power source voltage, it is necessary to set a certain state transition period, and wait for execution of a process until the power source voltage is stabilized. Similarly, in controlling supplying/suspending supply of a clock signal, it is necessary to wait for execution of a process until a clock signal is stabilized. Generally, the electric power consumption reducing effect is increased in the order of turning on/off a power source voltage, supplying/suspending supply of a clock signal, and switching to an interruption wait state/releasing the interruption wait state. Conversely, the state transition period is shortened in the order of switching to an interruption wait state/releasing the interruption wait state, supplying/suspending supply of a clock signal, and turning on/off a power source voltage. Accordingly, it is necessary to select either one of the above methods, considering the trade-offs.

The power control circuit 170 may use any one of the above three methods in the following description on electric power supply control.

Tasks 111 through 115 each includes a single or plural instruction codes. The tasks 111 through 112 include a first instruction code executable by the low-power consumption processor 141, and the tasks 113 through 115 include a second instruction code executable by the high-performance processor 151. The tasks 111 through 112 are run on a first OS (Operating System, hereinafter, called as OS), and the tasks 113 through 115 are run on a second OS.

The low-power consumption processor 141 and the high-performance processor 151 read out a task included in an application program stored in e.g. the memory 110 for execution. The tasks 111 through 115 are run by referring to data on the memory 110, and input/output data in and out of the peripheral modules 160. In the embodiment shown in FIG. 1, the tasks 111 through 112 are complied so that the tasks 111 through 112 are originally run on the low-power consumption processor 141, and the tasks 113 through 115 are complied so that the tasks 113 through 115 are originally run on the high-performance processor 151.

The first OS 120 on the memory 110 administers execution statuses of the tasks 111 through 112, and the second OS 121 on the memory 110 administers execution statuses of the tasks 113 through 115. The number of tasks, the number of operating systems, and a relation between the tasks and the operating systems are not necessarily identical to those in the example shown in FIG. 1. For instance, the number of operating systems to be operated may be changed depending on the number of low-power consumption processors 141 and the number of the high-performance processors 151, or the number of operating systems may be set to one or a fixed number, without depending on the number of processors.

In a state that an electric power is supplied from the power control circuit 170 to function the low-power consumption processor 141 and the high-performance processor 151, the first instruction code included in the tasks 111 through 112 to be run on the first OS 120 is executed by the low-power consumption processor 141, and the second instruction code included in the tasks 113 through 115 to be run on the second OS 121 is executed by the high-performance processor 151.

The hypervisor 130 corresponds to an example of an instruction converting section. In the case where the power control circuit 170 suspends supply of an electric power to the second power block 150, in other words, the high-performance processor 151 is rendered inoperative, the second instruction code included in the tasks 113 through 115 is converted into an instruction code executable by the low-power consumption processor 141.

The hypervisor 130 is operated on the low-power consumption processor 141. In the case where an operation of the high-performance processor 151 is suppressed by the power control circuit 170, the hypervisor 130 converts the second instruction code included in the tasks 113 through 115 and the second OS 121 to be originally executed by the high-performance processor 151 into an instruction code executable by the low-power consumption processor 141 so that the converted instruction code is executed by the low-power consumption processor 141.

Thereby, the low-power consumption processor 141 emulates an operation of the high-performance processor 151. As described above, the second OS 121 and the tasks 113 through 115 are programs including the second operation code to be originally run on the high-performance processor 151. However, during a time when electric power supply to the high-performance processor 151 is suppressed and the function of the high-performance processor 151 is suspended in the power saving time, the hypervisor 130 converts a second instruction code group included in a task to be executed by the high-performance processor 151 into an instruction code group executable by the low-power consumption processor 141. This enables to run a program on the low-power consumption processor 141, as well as on the high-performance processor 151.

In this example, instruction code conversion is not limited to so-called conversion of an operation field of an instruction. For instance, there is a case that instruction sets are identical to each other, but address maps of the peripheral modules 160 are different from each other (e.g. the address map usable by the low-power consumption processor 141 is small) between the low-power consumption processor 141 and the high-performance processor 151. In this embodiment, the "address conversion" is regarded as an example of "instruction code conversion". The following description in the embodiment is made without differentiating the address conversion and the instruction code conversion one from the other.

The hypervisor 130 has a function of allowing the first OS 120 and the second OS 121 to coexist (executing the first OS 120 and the second OS 121 in parallel in a time-sharing manner) on the low-power consumption processor 141 in the power saving operation mode, in addition to performing instruction code conversion. The operations of the hypervisor 130 are described in detail, referring to FIG. 4.

By employing the above configuration, in the case where a task including the second instruction code to be executed by the high-performance processor 151 is stored in the memory 110 in the power saving operation mode when the high-performance processor 151 is in an inoperative state, the hypervisor 130 converts the second instruction code included in the task into an instruction code executable by the low-power consumption processor 141, and the low-power consumption processor 141 executes the instruction code converted by the hypervisor 130. This enables to eliminate the need of temporarily activating the high-performance processor 151 in the power saving operation mode, and further reduce the electric power consumption of the multiprocessor system in the power saving operation mode.

For instance, in the case where graphics display of a date and time on a display screen of a mobile phone is operated by the high-performance processor 151, since the user does not gaze at the screen all the time during e.g. a call wait state of the mobile phone, it is not absolutely necessary to perform the clock display at a high speed. In view of this, it is not absolutely necessary to run a program at a high speed in the power saving operation mode such as a call wait state. In view of this, the hypervisor 130 is so configured that the low-power consumption processor 141 emulates an operation of the high-performance processor 151. In this configuration, although the performance of the multiprocessor system is considerably degraded, as compared with a case that a process such as a date and time display is operated by the high-performance processor 151, the electric power consumption can be advantageously reduced, as compared with a case that the high-performance processor 151 is temporarily operated, because there is no or less serious problem on performance degradation resulting from operating the hypervisor 130.

In the description referring to FIG. 1, an example has been described, wherein the first OS 120 to be operated on the low-power consumption processor 141, and the second OS 121 to be operated on the high-performance processor 151 are different from each other. Alternatively, an OS to be operated on the low-power consumption processor 141, and an OS to be operated on the high-performance processor 151 may be identical to each other. In the modification, the hypervisor 130 does not need to have a function of allowing two operating systems to coexist. The multiprocessor system may internally have an instruction converting section which converts a second instruction code to be originally executed on the high-performance processor 151 into an instruction code to be executed on the low-power consumption processor 141, and the instruction converting section may be configured to be operated while the high-performance processor 151 is not operated.

As described above, the memory 110 stores the first instruction code and the second instruction code. The low-power consumption processor 141 executes the first instruction code stored in the memory 110. The high-performance processor 151 executes the second instruction code stored in the memory 110. In the case where electric power supply to the high-performance processor 151 is suppressed by the power control circuit 170, the hypervisor 130 converts the second instruction code into an instruction code executable by the low-power consumption processor 141.

Alternatively, the hypervisor 130 may store a converted instruction code into the memory 110, and the low-power consumption processor 141 may execute the converted instruction code stored in the memory 110. Further alternatively, the low-power consumption processor 141 may store, into the memory 110, first data to be generated by executing one of the first instruction code and the converted instruction code; and the high-performance processor 151 may store, into the memory 110, second data to be generated by executing the second instruction code.

In the case where a clock signal to be supplied to the high-performance processor 151 is suspended by the power control circuit 170, the hypervisor 130 converts the second instruction code into an instruction code executable by the low-power consumption processor 141.

In the case where the high-performance processor 151 is set to a standby state by the power control circuit 170, the hypervisor 130 converts the second instruction code into an instruction code executable by the low-power consumption processor 141.

Figure 2:
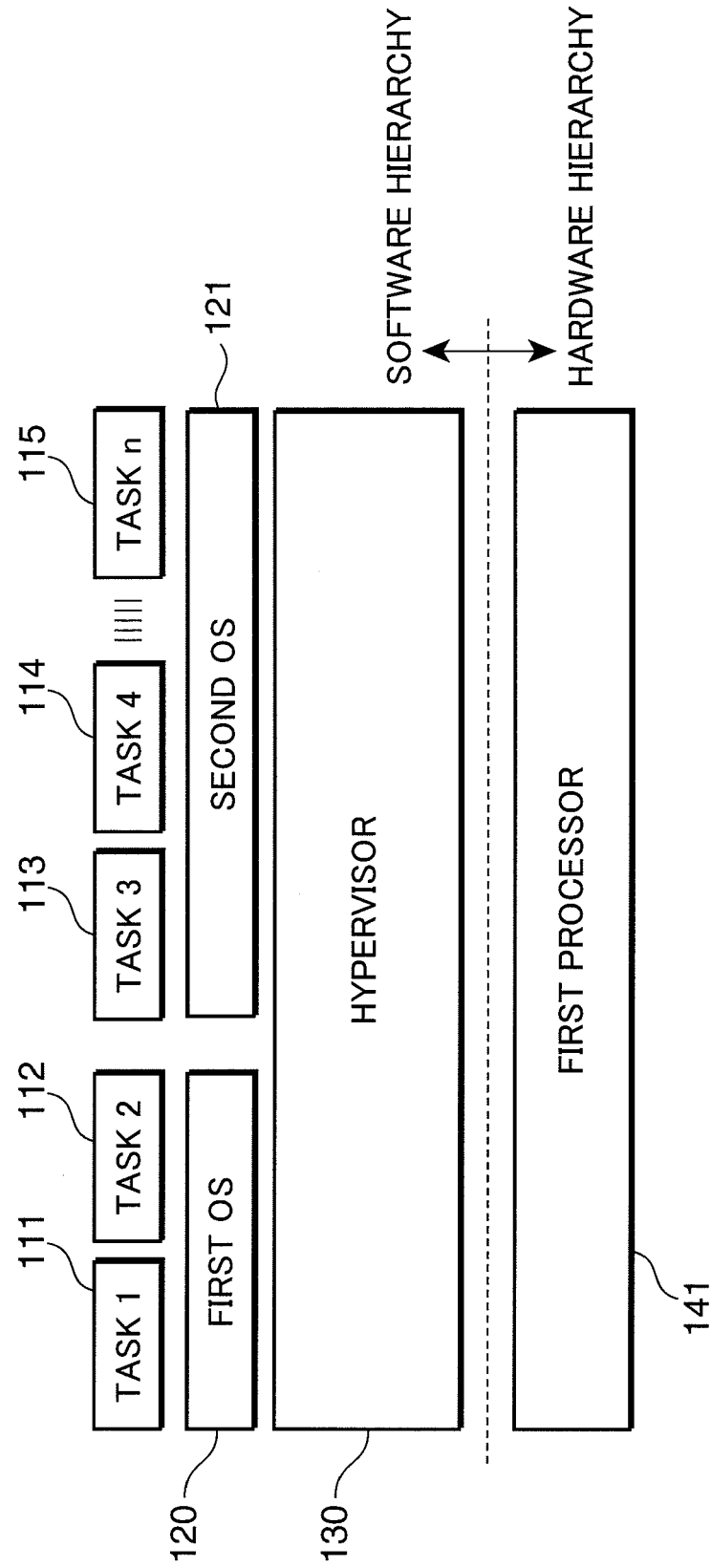
FIG. 2 is a diagram for describing a relation between a software hierarchy and a hardware hierarchy in a power saving operation mode of the multiprocessor system in the first embodiment.
Figure 3:
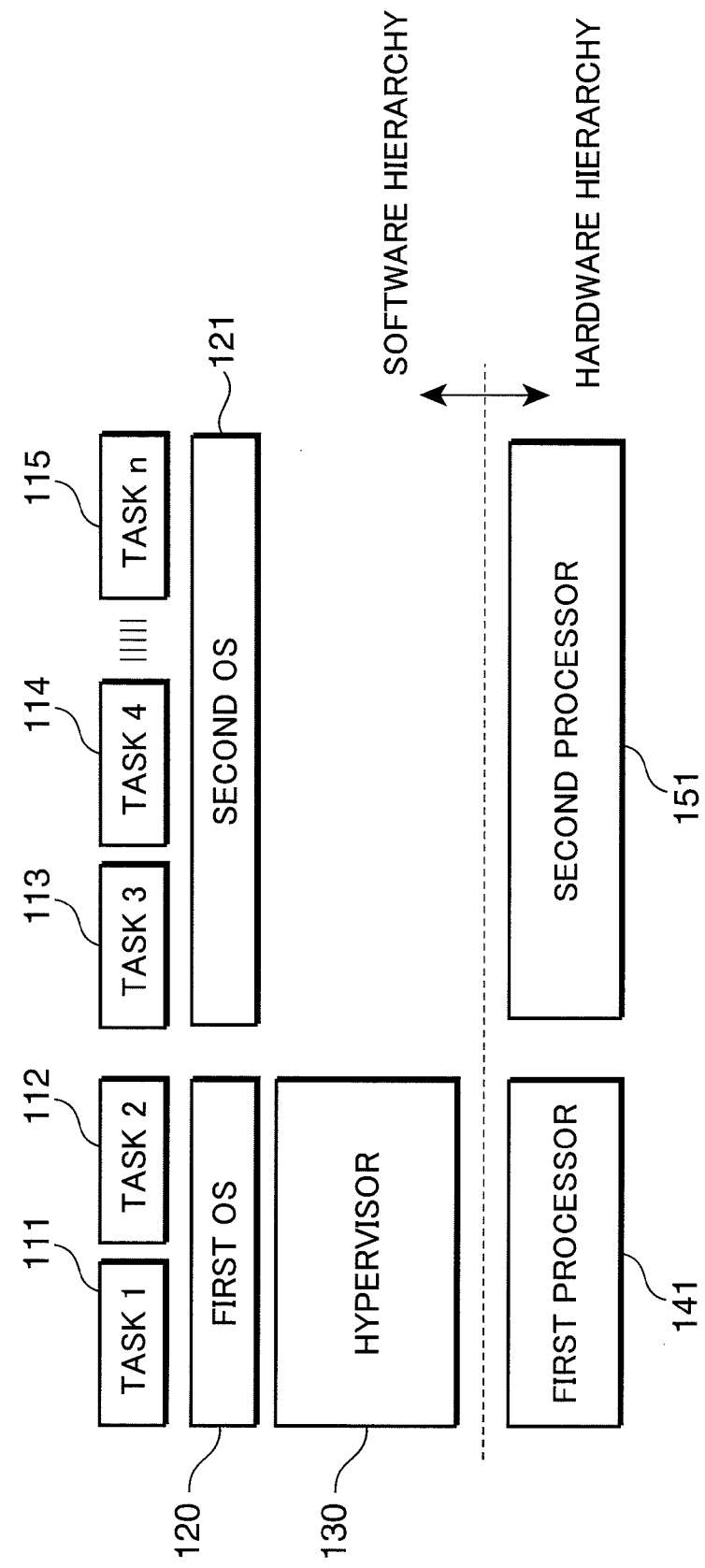
FIG. 3 is a diagram for describing a relation between a software hierarchy and a hardware hierarchy in a high-speed operation mode of the multiprocessor system in the first embodiment.

FIG. 2 is a diagram for describing a relation between a software hierarchy and a hardware hierarchy in the power saving operation mode of the multiprocessor system in the first embodiment. FIG. 3 is a diagram for describing a relation between a software hierarchy and a hardware hierarchy in the high-speed operation mode of the multiprocessor system in the first embodiment.

As described above, since electric power supply to the high-performance processor 151 is suspended in the power saving operation mode, as shown in FIG. 2, the high-performance processor 151 is not operated in the power saving operation mode. In performing the above operation, the hypervisor 130 is operated to convert data (e.g. the second instruction code, data to be referred to by the second instruction code, and data to be outputted by execution of the second instruction code) included in the second OS 121 and the tasks 113 through 115, into data processable by the low-power consumption processor 141, on the low-power consumption processor 141. Thus, since the converted data is processed by the low-power consumption processor 141, there is no need of adding or altering an interface of the low-power consumption processor 141.

Configuring the software architecture as shown in FIG. 2 enables to maximally reduce the number of times of operating the high-performance processor 151 in the power saving operation mode. Thereby, an instruction code included in the tasks 113 through 115 can be executed by the low-power consumption processor 141.

The tasks 113 through 115 to be run on the second OS 121 are executed on the high-performance processor 151 in the high-speed operation mode, as shown in FIG. 3. Specifically, the high-performance processor 151 executes the second instruction code included in the tasks 113 through 115 to be run on the second OS 121.

On the other hand, the low-power consumption processor 141 executes the first instruction code included in the tasks 111 and 112 to be run on the first OS 120.

Configuring the software architecture as shown in FIG. 3 in the high-speed operation mode enables to provide a multiprocessor system which operates a plurality of processors in parallel, while sharing a memory. Operating the low-power consumption processor 141 and the high-performance processor 151 in parallel enables to obtain high-speed processing performance and response performance, as expected.

Further, utilizing a method e.g. a method, wherein an interface section (not shown) to a hardware resource (not shown) to be utilized by the first OS 120 is switched depending on the power mode, or a method, wherein the hypervisor 130 provides the first OS 120 with an interface identical to the interface of the low-power consumption processor 141, eliminates the need of activating the hypervisor 130 in the high-speed operation mode. This arrangement enables to directly operate the first OS 120 on the low-power consumption processor 141.

Specifically, FIG. 3 shows an arrangement, wherein the hypervisor 130 is activated in the high-speed operation mode. However, employing an arrangement that an interface to a hardware resource to be utilized by the first OS 120 is switched depending on the power saving operation mode or the high-speed operation mode; or an arrangement that in the high-speed operation mode, the first OS 120 is provided with an interface to a hardware resource, which is identical to the interface to be used in the power saving operation mode, eliminates the need of activating the hypervisor 130 in the high-speed operation mode.

Figure 4:
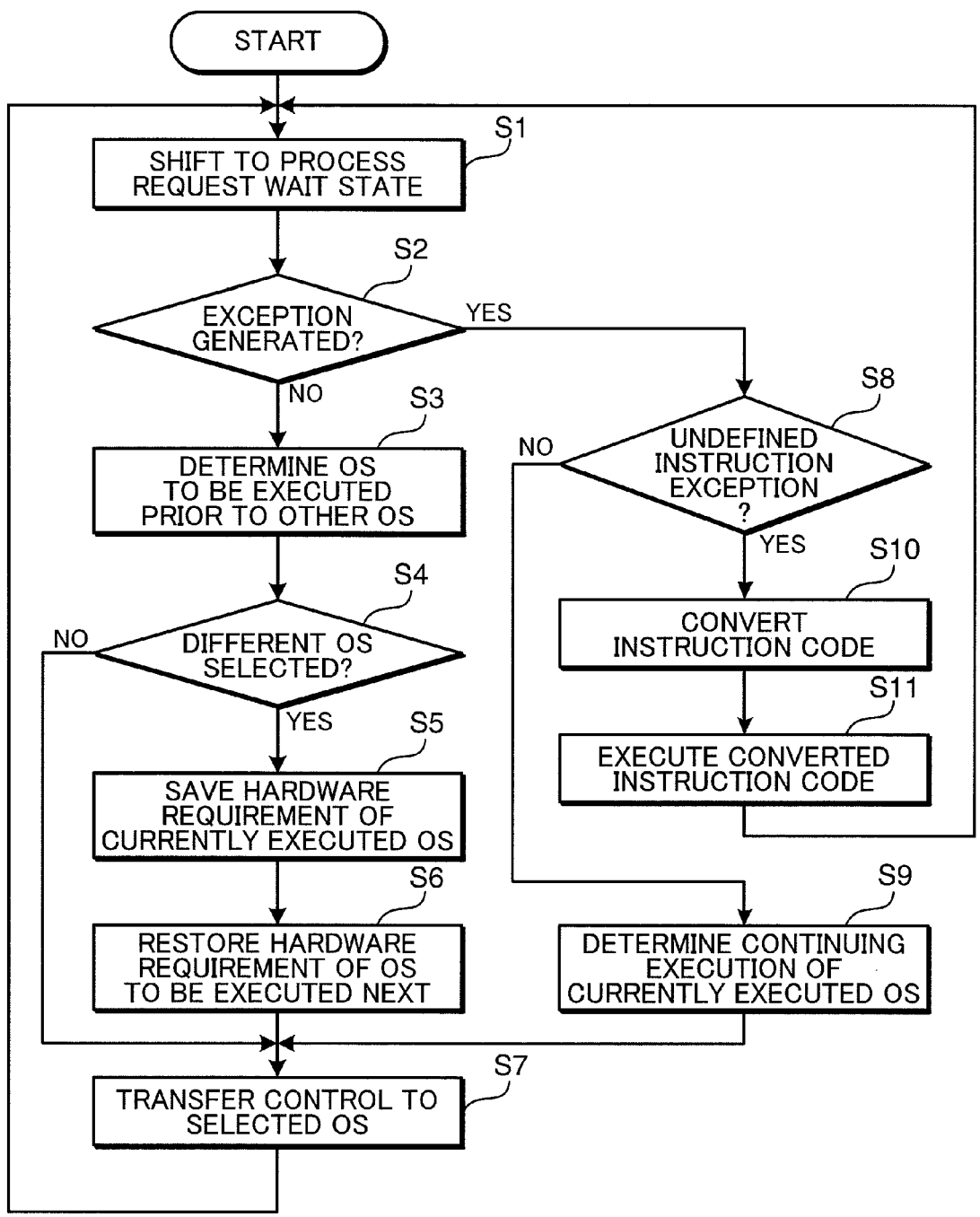
FIG. 4 is a flowchart for describing an example of an operation to be executed by a hypervisor.

FIG. 4 is a flowchart for describing an example of an operation to be executed by the hypervisor 130.

As described in FIG. 2, it should be noted that the hypervisor 130 has a function of operating two operating systems on the low-power consumption processor 141 in the power saving operation mode. In view of this, it is necessary to allow plural operating systems to coexist and be executed in a time sharing manner, in addition to realizing an emulation operation of emulating an operation of the high-performance processor 151.

After the hypervisor 130 is activated, the hypervisor 130 transfers control of running a task to either one of the first OS 120 and the second OS 121, and the OS to which the control has been transferred controls an operation of the task to be executed. In this state, the hypervisor 130 is temporarily shifted to a process request wait state, and the routine proceeds to Step S2 upon receiving a process request (Step S1).

Subsequently, upon receiving an exception which needs interrupting an ongoing process e.g. an interruption, an undefined instruction exception or an access violation to a protection area, or an explicit process request such as a function call from the first OS 120 or the second OS 121, the hypervisor 130 investigates a cause of the request. In this embodiment, the hypervisor 130 checks at first whether an exception has been generated (Step S2). If it is judged that an exception has been generated (YES in Step S2), the routine proceeds to Step S8. If, on the other hand, it is judged that an exception has not been generated (NO in Step S2), the routine proceeds to Step S3.

As described above, in this embodiment, since it is necessary to execute plural operating systems in a time sharing manner, if a cause of the request is other than an exception, in other words, if it is judged that an exception has not been generated in Step S2, the process request received by the hypervisor 130 is regarded as a request of switching a currently executed OS. The hypervisor 130 determines which OS is to be executed prior to the other OS, out of the first OS 120 and the second OS 121 (Step S3).

Representative examples of a method for determining an OS to be executed prior to the other OS are the methods disclosed in JP Hei 5-197577A, U.S. Pat. No. 5,995,745, and JP 2000-242512A. For instance, JP Hei 5-197577A recites a method, wherein predetermined time slices are given in advance to individual operating systems, and when the time slice of a targeted operating system out of the operating systems has been used up, an operating system other than the targeted operating system is executed. U.S. Pat. No. 5,995,745 recites a method, wherein top priority is given to one of the operating systems, and when the one operating system is set to an idling state, the other one of the operating systems is executed. JP 2000-242512A recites a method having higher expandability, wherein the priorities of tasks to be run on individual operating systems are compared with each other, and an operating system, out of the operating systems, which runs a task having a higher priority, is operated.

As a method to be used in the process of Step S3, any one of the methods disclosed in JP Hei 5-197577A, U.S. Pat. No. 5,995,745, and JP 2000-242512A may be used. Further, it is possible to use a method other than the above methods. In this embodiment, as far as the hypervisor 130 is operable to properly execute plural operating systems in a time sharing manner, the contents of an algorithm for selecting an OS do not matter.

Next, the hypervisor 130 judges whether the OS selected in Step S3 is identical to the currently executed OS (Step S4). If it is judged that the selected OS is identical to the currently executed OS (NO in Step S4), the routine proceeds to Step S7, and if it is judged that the selected OS is different from the currently executed OS (YES in Step S4), the routine proceeds to Step S5.

If it is judged that the selected OS is different from the currently executed OS, the hypervisor 130 saves the execution environment of the currently executed OS on the memory 110 (Step S5). Then, the hypervisor 130 restores the execution environment of an OS to be executed next from the memory 110 (Step S6). In this example, the execution environment of an OS includes information relating to register values and operation modes of a processor.

Thereafter, the hypervisor 130 transfers the control for running a task to the selected OS (Step S7), and the routine returns to Step S1.

On the other hand, in the case where it is judged that the cause of the received process request is generation of an exception in Step S2, the hypervisor 130 at first judges whether the generated exception is an exception resulting from execution of the second instruction code to be executed by the high-performance processor 151, by the low-power consumption processor 141 (Step S8). The exception to be judged in Step S8 is e.g. an exception resulting from a fact that the instruction code is an instruction code executable by the high-performance processor 151, but is an instruction code that is not defined in the low-power consumption processor 141. The exception is referred to as an undefined instruction exception. In the following, the undefined instruction exception is described. In the case where it is judged that the generated exception is not an undefined instruction exception (NO in Step S8), the routine proceeds to Step S9, and in the case where it is judged that the generated exception is an undefined instruction exception (YES in Step S8), the routine proceeds to Step S10.

In the case where it is judged that the generated exception is not an undefined instruction exception in Step S8, the hypervisor 130 determines to continue the execution, without switching the currently executed OS, because there has been generated an exception resulting from execution of an instruction code included in the currently executed OS or in a task group running on the currently executed OS (Step S9), and the routine proceeds to Step S7.

In the case where it is judged that the generated exception is an undefined instruction exception in Step S8, the hypervisor 130 converts an instruction code, which has been judged to be an undefined instruction, into an instruction code executable by the low-power consumption processor 141 (Step S10). Thereafter, the hypervisor 130 causes the low-power consumption processor 141 to execute the converted instruction code. The low-power consumption processor 141 executes the instruction code converted by the hypervisor 130 (Step S11). Thereafter, the routine returns to Step S1.

Operating the hypervisor 130 as shown in FIG. 4 enables to operate plural operating systems on the low-power consumption processor 141. Likewise, even if the low-power consumption processor 141 executes an instruction code exclusively loaded in the high-performance processor 151, the hypervisor 130 detects an undefined instruction exception resulting from execution of the instruction code. Thereafter, the hypervisor 130 converts an instruction code corresponding to the undefined instruction exception into an instruction code (group) interpretable and executable on the low-power consumption processor 141, using e.g. a conversion table, and the hypervisor 130 causes the low-power consumption processor 141 to execute the converted instruction code (group). Continuing execution of the process as described above enables to reduce the number of times of temporarily activating the high-performance processor 151 during a power saving time, thereby further reducing the electric power consumption.

The example described referring to FIG. 4 shows an arrangement, wherein the hypervisor 130 causes the low-power consumption processor 141 to execute the instruction code exclusively loaded in the high-performance processor 151, and judgment is made as to whether the generated exception is an undefined instruction exception. The embodiment is not limited to the above example. Alternatively, judgment may be made by analyzing the address of the instruction code in advance, and storing the analysis result in the hypervisor 130; or inhibiting the low-power consumption processor 141 from referring to an address space to be utilized by the high-performance processor 151, and generating an access violation exception.

FIG. 5 is a diagram for describing an example of a conversion table to be used by the hypervisor 130 in converting an instruction code corresponding to an undefined instruction exception into an instruction code (group) interpretable and executable on the low-power consumption processor 141.

The multiprocessor system in this embodiment is configured in such a manner that a conversion table 200 shown in FIG. 5 is stored in e.g. the memory 110. As shown in FIG. 5, the conversion table 200 holds therein a second instruction code 201 to be executed on the high-performance processor (second processor) 151, and a first instruction code (group) 202 for causing the low-power consumption processor 141 to execute a function corresponding to the second instruction code 201.

The memory 110 holds the conversion table 200 for converting the second instruction code into an instruction code executable by the low-power consumption processor 141. The memory 110 corresponds to an example of a conversion table holding section. The hypervisor 130 converts the second instruction code into an instruction code executable by the low-power consumption processor 141, based on the conversion table 200 held in the memory 110.

For instance, let it be assumed that the low-power consumption processor 141 has a 32-bit computation function. In the case where the high-performance processor 151 has a 64-bit computation function, the high-performance processor 151 can interpret and execute an instruction code corresponding to 64-bit computation. However, since the low-power consumption processor 141 has only the 32-bit computation function, the low-power consumption processor 141 cannot directly execute the instruction code 201 corresponding to 64-bit computation, and an undefined instruction exception is generated. In view of this, the conversion table 200 holds the instruction code (group) 202 for converting an instruction code corresponding to 64-bit computation into 32-bit computation. If an undefined instruction exception is generated, the hypervisor 130 refers to the conversion table 200 shown in FIG. 5, and converts a 64-bit computation instruction code corresponding to the undefined instruction exception into 32-bit computation instruction codes.

In the example shown in FIG. 5, the conversion table 200 holds 64-bit instruction codes corresponding to summation, subtraction, and multiplication; and 32-bit instruction code groups in correlation to each other.

For instance, concerning 64-bit summation and subtraction, 64-bit is divided into higher 32-bit and lower 32-bit, and data conversion is performed so that 32-bit data is subjected to summation or subtraction, with a carry or a borrow.

Similarly, concerning multiplication, 64-bit multiplication is performed by three 32-bit multiplications (resultantly, 64-bit), two 32-bit summations, and a save and restore process of a work register. The instruction conversion rule is not limited to the aforementioned 64-bit computation function. There is proposed an application example, wherein the operation of the peripheral modules 160 exclusively accessible by the high-performance processor 151 is emulated by a software (not shown) to be executed on the low-power consumption processor 141, in addition to the instruction code conversion.

Further, even in the case where an instruction code executable exclusively by the high-performance processor 151 is detected as a result of instruction code conversion by the hypervisor 130, the detected instruction code can be converted into an instruction code (group) executable by the low-power consumption processor 141 by referring to the conversion table 200 shown in FIG. 5 so that the instruction code can be operated by the low-power consumption processor 141.

In FIG. 5, there is described an example, wherein instruction code conversion is realized by the hypervisor 130 by referring to the conversion table 200. The instruction code conversion is not limited to the above example, but may be realized by e.g. a list format. Further alternatively, the instruction code conversion may be realized by e.g. a series of subroutine calls, wherein an instruction code including an exception, an exception code, and identifiers of the instruction code and the exception code are offset.

In the case where an instruction code is executed by the low-power consumption processor 141, as the number of overheads for instruction conversion and the number of instructions are increased, the performance of the low-power consumption processor 141 is greatly degraded, as compared with a case of executing the program by the high-performance processor 151. However, as described above, in a condition that the user seldom gazes at a screen of a mobile phone in performing a rendering process on a main screen of the mobile phone in a call wait state (in the power saving operation mode), performance degradation resulting from execution of an instruction code which should be originally executed by the high-performance processor 151, by the low-power consumption processor 141 in the power saving operation mode, is tolerable.

As described above, there is no restriction as to whether the hardware components described in this embodiment coexist in one LSI (Large Scale Integration), or are loaded in individual LSIs. The hypervisor 130 and the power control circuit 170 shown in FIG. 1 may be configured of one integrated circuit; or the first processor 141, the second processor 151, the hypervisor 130, and the power control circuit 170 shown in FIG. 1 may be configured of one integrated circuit.

Figure 6:
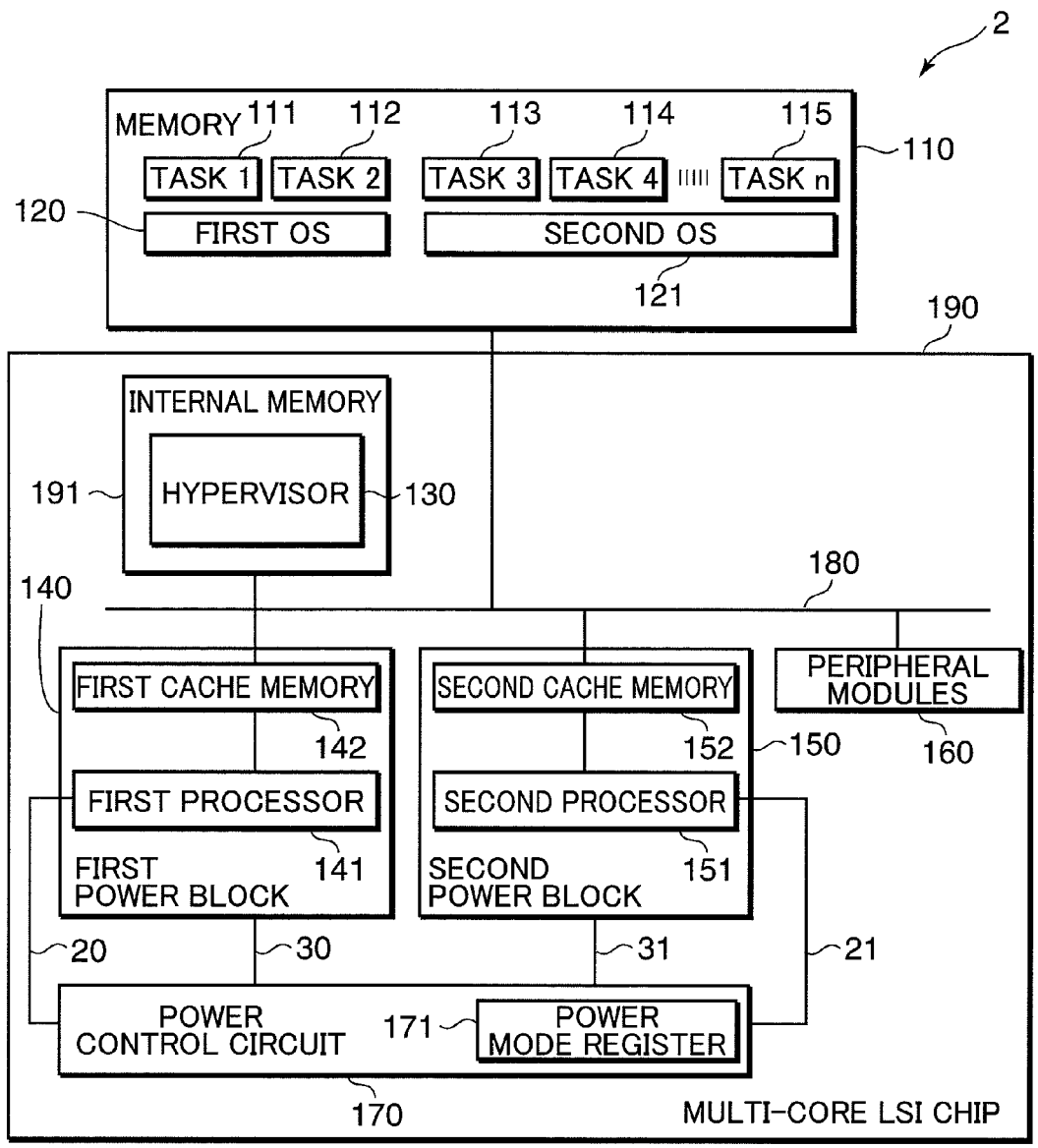
FIG. 6 is a diagram showing another example of the configuration of the multiprocessor system in the first embodiment.

FIG. 6 is a diagram showing another example of the configuration of the multiprocessor system in the first embodiment.

Referring to FIG. 6, constituent elements having identical reference numerals as those in FIG. 1 are constituent elements substantially identical or equivalent to those in FIG. 1, and detailed description thereof is omitted herein.

Referring to FIG. 6, the multiprocessor system 2 is provided with a memory 110, and a multi-core LSI chip 190 corresponding to a system LSI.

The multi-core LSI chip 190 includes an internal bus 180, a low-power consumption processor 141, a high-performance processor 151, peripheral modules 160, a power control circuit 170, a first cache memory 142 to be utilized by the low-power consumption processor 141, a second cache memory 152 to be utilized by the high-performance processor 151, control signal lines 20 and 21, electric power supply lines 30 and 31, and an internal memory 191. The power control circuit 170 has a power mode register 171.

A first power block 140 includes the first cache memory 142 to be utilized by the low-power consumption processor 141, in addition to the low-power consumption processor 141. A second power block 150 includes the second cache memory 152 to be utilized by the high-performance processor 151, in addition to the high-performance processor 151.

The multi-core LSI chip 190 is further loaded with the internal memory 191. A program for realizing an operation of the hypervisor 130 is stored in the internal memory 191. Thereby, as compared with a case that a program for realizing an operation of the hypervisor 130 is stored in the memory 110, an emulation operation can be performed at a high speed. Normally, the hypervisor 130 performs only restricted and fixed processes, such as coexistence and switching of plural operating systems, and emulation of an instruction code of the high-performance processor 151. Accordingly, the hypervisor 130 can be operated by loading the internal memory 191 having a smaller capacity than the capacity of the memory 110. Further, since it is rare to change the program for realizing an operation of the hypervisor 130, once the architecture of the system LSI is determined, it is possible to store the program of the hypervisor 130 in a mask ROM (Read Only Memory), an FLASH memory, or a like memory.

The above configuration enables to reduce the electric power consumption of the components within the multi-core LSI chip 190 as much as possible. Further, since the LSI is configured of the power control circuit 170, there is no need of wiring between the system LSIs shown in FIG. 1, and a low electric power consumption system can be established only by connecting the multi-core LSI chip 190 to the memory 110.

The multiprocessor system 2 shown in FIG. 6 employs the aforementioned configuration. Accordingly, a program can be executed only by the low-power consumption processor 141 which is operated at a relatively low performance and with a low electric power consumption in the power saving operation mode, thereby maximally reducing the electric power consumption in the power saving operation mode. In particular, the configuration is advantageously applied to an embedded computing system.

In the foregoing embodiment, described is an example, wherein only each one of the low-power consumption processor 141, the high-performance processor 151, and the peripheral modules 160 is provided. The number of processors may be other than two to obtain the effect of this embodiment. Even if the number of processors may be three or more, the embodiment may be applied to a multi-core system having three or more processors by converting an instruction code which is to be originally executed by a processor to which an electric power supply is suspended, into an instruction code interpretable and executable by the other processor which is operable during a power saving time; and executing the converted instruction code by the other processor during the power saving time.

Second Embodiment

FIG. 7 is a diagram showing an example of a configuration of a multiprocessor system in the second embodiment. Referring to FIG. 7, constituent elements having the same reference numerals as those in FIGS. 1 and 6 are constituent elements substantially identical or equivalent to those in FIGS. 1 and 6, and detailed description thereof is omitted herein.

Referring to FIG. 7, the multiprocessor system 3 in the second embodiment includes an internal bus 180, a memory 110, a first processor 141, a first cache memory 142, a second processor 151, a second cache memory 152, a power control circuit 170, and peripheral modules 160.

The multiprocessor system 3 in this embodiment has a feature that the power control circuit 170 is configured to control electric power supply to each of the low-power consumption processor 141, the high-performance processor 151, the first cache memory 142, and the second cache memory 152.

In the second embodiment shown in FIG. 7, the power block is divided into a larger number of sub blocks, as compared with the first embodiment.

In the multiprocessor system 3 shown in FIG. 7, processor power blocks and cache power blocks are provided. The first processor power block 140a is a power block including the low-power consumption processor 141, and the second processor power block 150a is a power block including the high-performance processor 151. The power control circuit 170 is operable to supply an electric power to these processors independently of each other. On the other hand, the first cache power block 140b is a power block including the first cache memory 142, and the second cache power block 150b is a power block including the second cache memory 152. An electric power is supplied to the first processor power block 140a, the second processor power block 150a, the first cache power block 140b, and the second cache power block 150b respectively through electric power supply lines 30 through 33.

Providing a power block for a processor, and a power block for a cache memory independently of each other enables to supply an electric power to the cache memory in a state that electric power supply to the processor is cut off. In the case where cutoff of power supply to the cache memory, and cutoff of power supply to the processor are simultaneously performed, and then, an electric power is supplied to the cache memory and the processor, it is necessary to perform a process of updating data (e.g. information relating to an execution environment, an instruction code, and data to be referred to by the instruction code) stored in the cache memory, and executing an instruction code loaded in the cache memory by the processor. Supplying an electric power to a cache memory to be utilized by a processor to which electric power supply is cut off, while cutting off power supply to the processor enables to eliminate a delay of time resulting from updating the data in the cache memory in response to switching of the power mode.

In this embodiment, more fine electric power control can be performed by providing a power block for a processor and a power block for a cache memory independently of each other. In view of this, operational states (power modes) such as a shutdown mode, a standby mode, and a high-speed standby mode are provided, in addition to the power saving operation mode and the high-speed operation mode. Similarly to the above, the power control circuit 170 is operable to perform control operations such as turning on/off electric power supply, supplying/suspending supply of a clock signal, and switching to an interruption wait state. In this embodiment, the following description is made based on the premise that control is performed by turning on/off electric power supply, and supplying/suspending supply of a clock signal in cooperation with each other.

FIG. 8 is a diagram showing an example of a lookup table showing targets to be operated in correspondence to power modes settable by the power mode register 171, and operation contents of the hypervisor 130.

The power control circuit 170 stores in advance a lookup table 210, wherein plural power modes; and electric power supply targets, clock signal supply targets, and operation contents of the hypervisor in the respective power modes are correlated to each other. The power control circuit 170 determines supply of an electric power from a power source to each of the power blocks, supply of a clock signal to each of the power blocks, and execution of the hypervisor 130, based on e.g. the lookup table 210.

Referring to FIG. 8, the lookup table 210 includes power modes 211, electric power supply targets 212 indicating destinations to which a power block corresponding to the respective power modes 211 is supplied, clock signal supply targets 213 indicating destinations to which a clock signal corresponding to the respective power modes 211 is supplied, and information 214 relating to whether an emulation function of the hypervisor 130 corresponding to the respective power modes 211 is to be validated.

In the case where the power mode 211 is the shutdown mode, the multiprocessor 3 itself is not operated. In the shutdown mode, an electric power and a clock signal are not supplied to any of the low-power consumption processor 141, the high-performance processor 151, the first cache memory 142, and the second cache memory 152. Since these processors are not operated, the hypervisor 130 itself is not operated.

In the case where the power mode 211 is the standby mode, data stored in the first cache memory 142 is held to restore the system at a high speed. In the standby mode, the power control circuit 170 supplies an electric power only to the first cache memory 142 (the first cache power block 140b) to hold the data stored in the first cache memory 142. However, since the power control circuit 170 does not supply an electric power to the power blocks other than the first cache power block 140b, a process based on the information stored in the first cache memory 142 is not performed. Accordingly, the power control circuit 170 is not required to supply a clock signal. In the standby mode, since the low-power consumption processor 141 and the high-performance processor 151 are not operated, the hypervisor 130 is not operated.

In the case where the power mode 211 is the power saving operation mode, this means that the multiprocessor system 3 is in the aforementioned power saving operation mode. In the power saving operation mode, all the tasks loaded in the multiprocessor system 3 are run, utilizing the low-power consumption processor 141. In view of this, the power control circuit 170 supplies an electric power and a clock signal to the low-power consumption processor 141 and the first cache memory 142. The power control circuit 170 does not supply an electric power and a clock signal to the second processor 151 and the second cache memory 152. Simultaneously, the hypervisor 130 is operated to convert a second instruction code to be used by the high-performance processor 151 so that a task to be originally run on the high-performance processor 151 and a second OS 121 are also allowed to run on the low-power consumption processor 141.

In the case where the power mode 211 is the high-speed standby mode, data stored in the second cache memory 152 is held to restore the high-performance processor 151 at a high speed. In the high-speed standby mode, the operation contents of the low-power consumption processor 141, the first cache memory 142, and the hypervisor 130 are identical to those in the power saving operation mode. In the high-speed standby mode, the power control circuit 170 supplies an electric power to the second cache memory 152 to hold data stored in the second cache memory 152. The power control circuit 170 does not supply an electric power to the second processor 151, and does not supply a clock signal to the second processor 151 and the second cache memory 152. Thereby, the high-performance processor 151 is allowed to perform a process immediately after activation, using the information stored in the second cache memory 152.

In the high-speed standby mode, since the second cache memory 152 is only required to hold data, there is no need of supplying a clock signal to the second cache memory 152. However, in the case where a snoop control to be described later is performed, it should be noted that a process of invalidating the second cache memory 152 is required, and accordingly, supply of a clock signal to the second cache memory 152 is required.

Lastly, in the case where the power mode 211 is the high-speed operation mode, this means that the multiprocessor system 3 is in the aforementioned high-speed operation mode. In the high-speed operation mode, the power control circuit 170 supplies an electric power and a clock signal to all of the low-power consumption processor 141, the high-performance processor 151, the first cache memory 142, and the second cache memory 152. Since a task and the second OS 121 to be originally run on the high-performance processor 151 are executed on the high-performance processor 151, there is no need of converting the second instruction code into an instruction code executable by the low-power consumption processor 141. Thus, there is no need of operating the hypervisor 130.

As described above, fine power saving control can be performed by causing the power control circuit 170 to change the electric power supply operation, the clock signal supply operation, and the operation of the hypervisor 130 in accordance with individual values (power modes) of the power mode register 171. Causing the hypervisor 130 to perform an emulation operation in the power saving operation mode and the high-speed standby mode enables to run a task and an OS to be originally run on the high-performance processor 151, on the low-power consumption processor 141. The emulation operation means an operation of converting the second instruction code to be used by the high-performance processor 151 into an instruction code executable by the low-power consumption processor 141, and causing the low-power consumption processor 141 to execute the converted instruction code.

Thereby, electric power supply to the high-performance processor 151 during a power saving time can be reduced as much as possible, which enables to further reduce the electric power consumption. Further, providing the standby mode and the high-speed standby mode enables to further reduce a delay by a cache miss at a point of time when supply of an electric power to the low-power consumption processor 141 or the high-performance processor 151 is resumed. This is advantageous in further increasing the processing speed, and shortening the response time.

FIG. 9 is a flowchart for describing an operation to be executed by the power control circuit 170 in the second embodiment.

In this embodiment, description is made based on the premise that a microprocessor for power control is loaded in the power control circuit 170, and the power control is realized by a process flow. Alternatively, the control may be realized by a hardware such as a logic circuit or a sequential circuit.

First, the power control circuit 170 monitors change of a setting value (in this example, the power mode) of the power mode register 171, and the routine proceeds to Step S22, if a change of the setting value is detected (Step S21).

In the case where a change of the setting value of the power mode register 171 is detected, the power control circuit 170 specifies a control target corresponding to the changed setting value (power mode), using the lookup table 210 shown in FIG. 8, and supplies an electric power to the specified control target (power block) (Step S22).

Thereafter, if the operation of the hardware (such as a processor and a cache memory) included in the power block to which the electric power is newly supplied is stabilized, the power control circuit 170 supplies a clock signal to the power block specified and stored in the lookup table 210 (Step S23).

Normally, a wait time required in stabilizing electric power supply and clock signal supply is a constant inherent to a hardware. Accordingly, the user is only required to wait for a time defined in interruption waiting or a polling operation, utilizing e.g. a clock/watchdog timer (not shown) in order to stabilize the operation.

Thereafter, if the operation of the hardware (such as the processor and the cache memory) included in the power block to which a clock signal is newly supplied is stabilized, the power control circuit 170 judges whether the emulation operation of the hypervisor 130 is changed between before change of the power mode and after change of the power mode by referring to the lookup table 210 (Step S24). If it is judged that the emulation operation is changed (YES in Step S24), the routine proceeds to Step S25, and if it is judged that the emulation operation is not changed (NO in Step S24), the routine returns to Step S21.

The lookup table 210 shown in FIG. 8 holds the information 214 relating to whether the emulation function of the hypervisor 130 is to be activated with respect to each of the power modes 211. For instance, the information 214 of the hypervisor 130, which corresponds to the "SHUTDOWN MODE" or the "STANDBY MODE" is "NOT OPERATED". This means that the hypervisor 130 is not operated, in the case where the power mode is the shutdown mode or the standby mode. In this case, it is needless to say that the emulation operation of the hypervisor 130 is not activated (in other words, unused).

Further, the information 214 of the hypervisor 130, which corresponds to the "POWER SAVING OPERATION MODE" or the "HIGH-SPEED STANDBY MODE" is "EMULATION OPERATION". This means that in the case where the power mode is the power saving operation mode or the high-speed standby mode, the hypervisor 130 is operated, and the emulation function of the hypervisor 130 is activated.

Further, the information 214 of the hypervisor 130, which corresponds to the "HIGH-SPEED OPERATION MODE" is "NOT OPERATED, OR OPERATED (EXCEPT FOR EMULATION)". This means that in the case where the power mode is the "HIGH-SPEED OPERATION MODE", the hypervisor 130 may be operated, but the emulation function of the hypervisor 130 is not used.

Judging whether the emulation operation is changed in Step S24 means judging whether the emulation operation of the hypervisor 130 is changed from unused to activated, or from activated to unused between before change of the power mode and after change of the power mode.

For instance, in the case where the power mode is changed from the high-speed operation mode to the power saving operation mode, the emulation function is changed from unused to activated. In this case, the power control circuit 170 judges that the emulation operation is changed. If, on the other hand, in the case where the power mode is changed from the high-speed standby mode to the power saving operation mode, the power control circuit 170 judges that the emulation operation is not changed, because the emulation function is not changed.

In the case where it is judged that the emulation operation is changed in Step S24, the power control circuit 170 issues a notification for activating or inactivating the emulation operation to the low-power consumption processor 141 (Step S25). In the case where a notification for activating the emulation operation is received, the low-power consumption processor 141 runs a program for functioning the emulation operation in the hypervisor 130, which is stored in the memory 110. In the case where a notification for inactivating the emulation operation is received, the low-power consumption processor 141 suspends execution of a program for functioning the emulation operation.

There is proposed e.g. notification by interruption, as an exemplified notification method to the low-power consumption processor 141 in Step S25. It is possible to adopt a method, wherein the hypervisor 130 checks the value of the power mode register 171 by polling, other than the notification method by interruption to the low-power consumption processor 141.

After Step S25 is terminated, the routine returns to Step S21.

Operating the power control circuit 170 based on the process flow shown in FIG. 9 enables to perform an electric power supply operation, a clock signal supply operation, and an operation of changing the emulation operation in accordance with the individual values of the power mode register 171.

In this embodiment, the low-power consumption processor 141 may store, into the memory 110, first data to be generated by executing one of the first instruction code and the converted instruction code; and the high-performance processor 151 may store, into the memory 110, second data to be generated by executing the second instruction code.

Further alternatively, the low-power consumption processor 141 may store, into the first cache memory 142, data to be generated by executing the first instruction code, using the first data stored in the memory 110, and store, into the first cache memory 142, data to be generated by executing the converted instruction code, using the second data stored in the memory 110; and the high-performance processor 151 may store, into the second cache memory 152, data to be generated by executing the second instruction code, using the second data stored in the memory 110.

Further alternatively, the low-power consumption processor 141 may store, into the memory 110 and the first cache memory 142, data to be generated by executing the first instruction code, using the first data stored in the memory 110, and store, into the memory 110 and the first cache memory 142, data to be generated by executing the converted instruction code, using the second data stored in the memory 110; and the high-performance processor 151 may store, into the memory 110 and the second cache memory 152, data to be generated by executing the second instruction code, using the second data stored in the memory 110.

Third Embodiment

In the foregoing embodiments of the invention, the low electric power consumption technology mainly using processors has been described. Generally, however, it is necessary to realize the low electric power consumption technology including a memory and peripheral modules. For instance, in an ordinary multiprocessor system and multi-core LSI, normally, peripheral modules are correlated to individual processors by one-to-one correspondence in terms of hardware or at initialization; or notify a result such as an interruption to a processor which has conducted a process request.

However, in the foregoing embodiments, if there is a correlation between a processor and peripheral modules which perform e.g. an interruption, an unintended processor may be operated at a timing such as an interruption, which may fail to realize an intended low electric power consumption technology.

As described above, in the conventional multiprocessor system, it is often the case that individual interruptions are allocated to individual processors depending on the types of the interruptions. However, a multiprocessor system of the third embodiment is provided with a configuration, wherein an interruption is notified to either one of the processors depending on the power modes, upon receiving an interruption signal from the peripheral modules.

Figure 10:
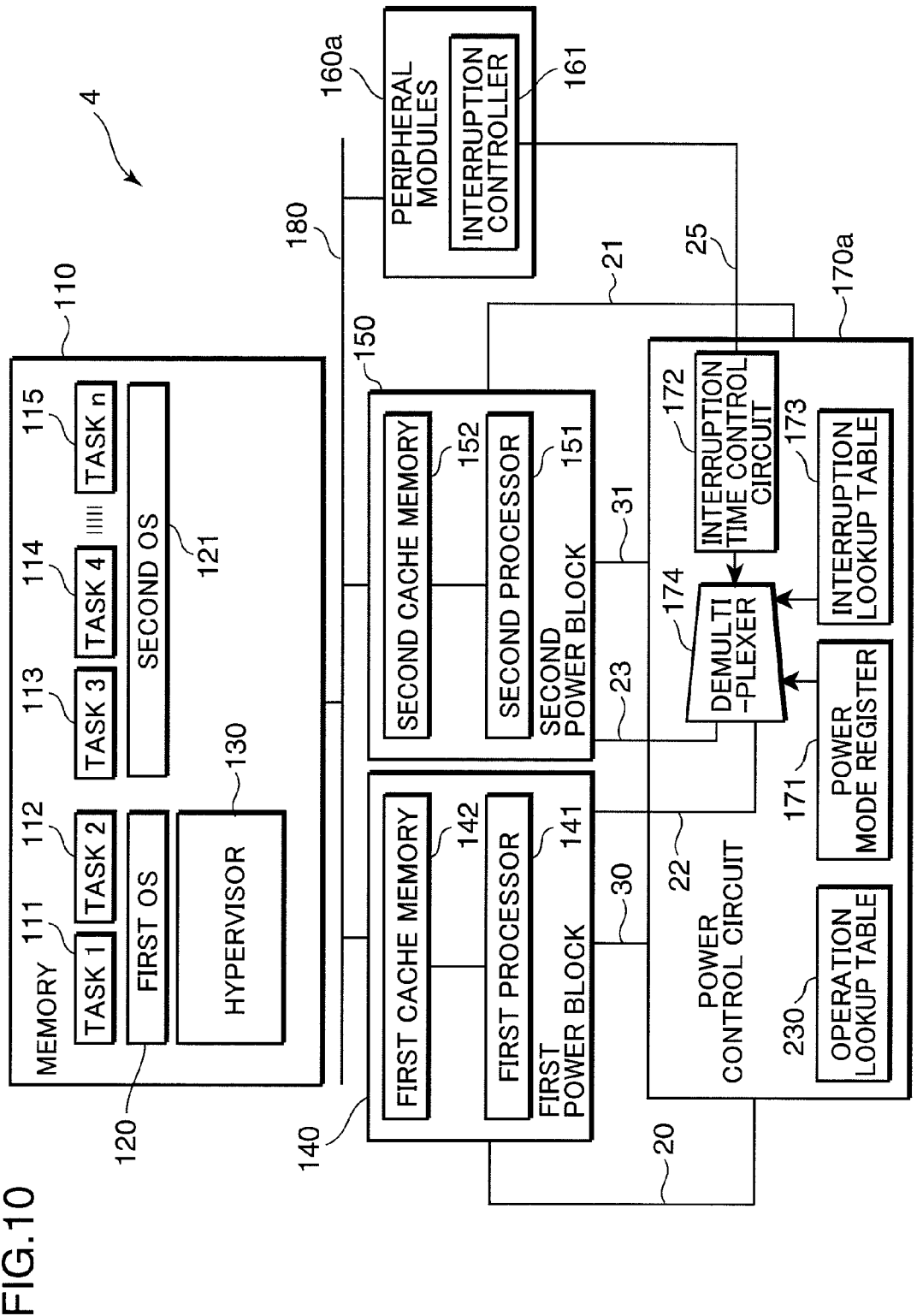
FIG. 10 is a diagram showing an example of a configuration of a multiprocessor system in a third embodiment of the invention.

FIG. 10 is a diagram showing an example of a configuration of the multiprocessor system in the third embodiment. Referring to FIG. 10, constituent elements having identical reference numerals as those in FIG. 1 or FIG. 6 are constituent elements substantially identical or equivalent to those in FIG. 1 or FIG. 6, and detailed description thereof is omitted herein.

Referring to FIG. 10, the multiprocessor system 4 in the third embodiment includes an internal bus 180, a memory 110, a first processor 141, a first cache memory 142, a second processor 151, a second cache memory 152, a power control circuit 170a, and peripheral modules 160a.

FIG. 10 shows a configuration that the peripheral modules 160a include an interruption controller 161. Alternatively, the interruption controller 161 may be provided independently of the peripheral modules 160a.

The interruption controller 161 generates an interruption to a processor, and causes the processor to perform a necessary process at a point of time when an event is generated in the peripheral modules 160a in response to a user's manipulation or a change in the external environment condition, or at a point of time when a process requested by the processor has been completed.

A signal line 25 transmits an interruption signal including the event generated in the peripheral modules 160a.

The power control circuit 170a includes an interruption time control circuit 172, an interruption lookup table 173, and a demultiplexer 174, in addition to the power mode register 171.

The demultiplexer 174 is a circuit for determining to which processor, out of the low-power consumption processor 141 and the high-performance processor 151, an interruption signal received through the interruption signal line 25 is to be notified. The demultiplexer 174 is connected to the low-power consumption processor 141 through a signal line 22, and is connected to the high-performance processor 151 through a signal line 23. The demultiplexer 174 transmits an interruption signal through the signal line 22, in the case where the interruption signal is to be notified to the low-power consumption processor 141, and transmits an interruption signal to the high-performance processor 151 through the signal line 23, in the case where the interruption signal is to be notified to the high-performance processor 151.

The interruption lookup table 173 is table data to be used in specifying an interruption notification target processor depending on individual interruption factors. Interruption notification target processors in default are set in the interruption lookup table 173. The demultiplexer 174 specifies an interruption target processor by referring to the values of power modes, which are stored in the power mode register 171, as well as utilizing the table data. Specifically, the demultiplexer 174 basically uses a method for notifying the low-power consumption processor 141 of an interruption in a power saving operation mode, and notifying a processor selected by using the interruption lookup table 173 of an interruption in a high-speed operation mode.

Similarly to the description referring to FIG. 8, in this embodiment, described is an example, wherein five operation modes (power modes) i.e. a shutdown mode, a standby mode, a power saving operation mode, a high-speed standby mode, and a high-speed operation mode are provided as the types of power modes. To simplify the understanding, a method for specifying an interruption target processor in correspondence to FIG. 10 is described referring to lookup tables shown in FIGS. 11 and 12, and a process flow shown in FIGS. 13 and 14.

The interruption time control circuit 172 is a circuit for controlling a timing of notifying an interruption signal received from the interruption controller 161 to a target processor. For instance, in the case where the power mode of a processor to which an interruption is to be notified is the standby mode or the shutdown mode, it is necessary to wait until the target processor is brought to an interruption receivable state. On the other hand, an interruption is generated irrespective of whether the processor is in an interruption receivable state. In view of this, the interruption time control circuit 172 is constituted of e.g. a delay circuit, and has a function of delaying transmission of an interruption signal to a target processor so that notification is allowed after the target processor is brought to an interruption receivable state, in the case where the interruption signal is received.

In the case where it is necessary to notify a processor in the standby mode or the shutdown mode of an interruption, a general processor is normally loaded with a function of activating a target processor, and notifying the target processor of an interruption at a point of time when the target processor is stabilized. However, in this embodiment, it is necessary to activate a hypervisor 130, and set an execution environment using e.g. the first cache memory 142 and the second cache memory 152. This embodiment has a feature that a delay time by which transmission of an interruption signal by the interruption time control circuit 172 is delayed is set to a time equal to or longer than a time required in completing an activation process of the hypervisor 130. This enables to eliminate a likelihood that an undefined instruction exception may be generated during execution of an interruption process, resulting from notification of an interruption to a target processor before activation of the hypervisor 130, which may fail to specify the exception, and enables to stably continue the process.

In this embodiment, description has been made based on the premise that the interruption time control circuit 172 is realized as a hardware (circuit). Alternatively, the embodiment may have a configuration provided with a software (program) for realizing the above function.

Employing the above configuration enables to notify the low-power consumption processor 141 of an interruption in the power saving operation mode, notify a target processor of an interruption in the high-speed operation mode, and inhibit an interruption notification to the high-performance processor 151 in the power saving operation mode.

FIG. 11 is a diagram showing an example of an interruption lookup table to be used in the third embodiment. The interruption lookup table is used in allocating an interruption request target processor to the low-power consumption processor 141 or the high-performance processor 151 in default.

Referring to FIG. 11, the interruption lookup table 173 includes interruption request source information 221 and interruption target information 222 to be described later. The interruption request source information 221 is information for specifying a request source of an interruption signal received from the interruption controller 161. The interruption target information 222 is information for indicating whether the request from the request source is to be executed by the low-power consumption processor 141 or the high-performance processor 151.

The power control circuit 170a stores the interruption lookup table 173, wherein request sources of an interruption signal received from the interruption controller 161, and processors for executing the requests from the respective request sources are correlated to each other.

FIG. 11 shows an example, wherein in the case where the interruption request source is a serial communications operable even in the power saving operation mode, or a network device, the target process is allocated to the low-power consumption processor 141 in default; and in the case where the interruption request source is a device requiring a high-speed processing such as an image processing or a display indication, the target process is allocated to the high-performance processor 151 in default.

Upon receiving an interruption notification from the interruption controller 161, the power control circuit 170a specifies a request source, and specifies a processor which has been allocated in default based on the specified request source. For instance, information relating to the request source may be transmitted in correlation to an interruption request, as well as the interruption request, to specify the request source. Specifically, the interruption controller 161 transmits, to the power control circuit 170a, an interruption signal including an interruption request, and request source specifying information for specifying the request source.

FIG. 12 is a diagram showing an example of an operation lookup table showing operation contents, based on the power mode register 171 and the interruption lookup table 173. The power control in this embodiment may be performed by loading a microprocessor for power control in the power control circuit 170a, and configuring a program, wherein an operation lookup table 230 is held as table data. Further alternatively, the power control may be performed by configuring the operation lookup table 230 of a sequential circuit or a logic circuit.

After the power control circuit 170a specifies a processor to be allocated in default, using the interruption lookup table 173 shown in FIG. 11, the power control circuit 170a specifies a processor to be actually allocated depending on the power modes, using the operation lookup table 230 shown in FIG. 12; and determines how the interruption time control circuit 172 and the demultiplexer 174 are operated.

In the operation lookup table 230 shown in FIG. 12, power modes 231 at which the power control circuit 170a are controlled, processors 232 in default, which have been specified by using the interruption lookup table 173 shown in FIG. 11, processors 233 to which an interruption is actually notified by the demultiplexer 174, and operation contents 234 of the interruption time control circuit 172 are correlated to each other.

The power control circuit 170a stores the operation lookup table 230, wherein the power modes, the processors specified by using the interruption lookup table 173, the processors to which an interruption is actually notified by the demultiplexer 174, and the operation contents of the interruption time control circuit 172 are correlated to each other.

The power control circuit 170a holds the operation lookup table 230 shown in FIG. 12, and controls an operation of the demultiplexer 174 and an operation of the interruption time control circuit 172, using the power mode register 171 and the interruption lookup table 173.

Referring to FIG. 12, in the case where the power mode 231 is the shutdown mode or the standby mode, and the processor 232 in default, which has been specified by referring to the interruption lookup table 173 is the low-power consumption processor 141, the processor 233 to which an interruption is notified by the demultiplexer 174 is the low-power consumption processor 141, and the operation 234 of the interruption time control circuit 172 indicates a wait state for stabilization of the low-power consumption processor 141. This means that after the power control circuit 170a starts supplying an electric power to a first power block 140 (the low-power consumption processor 141 and the first cache memory 142), the power control circuit 170a controls the interruption time control circuit 172 to delay notification of an interruption from the demultiplexer 174 to the low-power consumption processor 141 by a time required for stabilizing the low-power consumption processor 141. In this case, a time required for stabilizing the first cache memory 142 is set shorter than the time required for stabilizing the low-power consumption processor 141.

In the case where the power mode 231 is the shutdown mode or the standby mode, and the processor 232 in default, which has been specified by referring to the interruption lookup table 173, is the high-performance processor 151, the processor 233 to which an interruption is notified by the demultiplexer 174 is the low-power consumption processor 141, and the operation 234 of the interruption time control circuit 172 indicates a wait state for stabilization of the low-power consumption processor 141 and activation of the hypervisor 130. This means that after the power control circuit 170a starts supplying an electric power to the first power block 140 (the low-power consumption processor 141 and the first cache memory 142), the power control circuit 170a controls the interruption time control circuit 172 to delay notification of an interruption from the demultiplexer 174 to the low-power consumption processor 141 by a time corresponding to summation of a time required for stabilizing the low-power consumption processor 141, and a time required for activating the hypervisor 130 and the emulation operation.

In the case where the power mode 231 is the power saving operation mode or the high-speed standby mode, and the processor 232 in default, which has been specified by referring to the interruption lookup table 173, is the low-power consumption processor 141, the processor 233 to which an interruption is notified by the demultiplexer 174 is the low-power consumption processor 141, and the operation 234 of the interruption time control circuit 172 indicates immediate interruption notification. This means that an interruption notification from the demultiplexer 174 to the low-power consumption processor 141 is performed, without performing a delay process by the interruption time control circuit 172.

In the case where the power mode 231 is the power saving operation mode, and the processor 232 in default, which has been specified by referring to the interruption lookup table 173, is the high-performance processor 151, the processor 233 to which an interruption is notified by the demultiplexer 174 is the low-power consumption processor 141, and the operation 234 of the interruption time control circuit 172 indicates a wait state for activating the hypervisor 130. This means that the power control circuit 170a controls the interruption time control circuit 172 to delay notification of an interruption from the demultiplexer 174 to the low-power consumption processor 141 by a time required for completing activation of the hypervisor 130 to allow the low-power consumption processor 141 to execute the contents to be originally executed by the high-performance processor 151.

In the case where the power mode 231 is the high-speed standby mode, and the processor 232 in default, which has been specified by referring to the interruption lookup table 173, is the high-performance processor 151, the processor 233 to which an interruption is notified by the demultiplexer 174 is the high-performance processor 151, and the operations 234 of the interruption time control circuit 172 indicates a wait state for stabilization of the high-performance processor 151 and data transfer between cache memories. This means that after the power control circuit 170a starts supplying an electric power to a second power block 150 (the high-performance processor 151 and the second cache memory 152), the power control circuit 170a controls the interruption time control circuit 172 to delay notification of an interruption from the demultiplexer 174 to the high-performance processor 151 by a time corresponding to summation of a time required for stabilizing the high-performance processor 151, and a time required for updating the data (such as the execution environment of a second OS 121 and data to be referred to by an instruction code) in the second cache memory 152 by the high-performance processor 151.

In the above configuration, a time required for stabilizing the second cache memory 152 is set shorter than the time required for stabilizing the high-performance processor 151. Further, the time required for updating the data in the second cache memory 152 e.g. the execution environment of the second OS 121 and data to be referred to by an instruction code is a time required for transferring the data required by the high-performance processor 151 from the first cache memory 142 to the second cache memory 152, and completing the data transfer.

In the case where the power mode 231 is the power saving operation mode or the high-speed standby mode, since the program to be run on the high-performance processor 151 is run on the low-power consumption processor 141 by an emulation operation, there is a case that an instruction code and data to be originally used by the high-performance processor 151 reside on the first cache memory 142. If the instruction code and the data of the high-performance processor 151, which reside on the first cache memory 142, can be specified by identification information as represented by address information, it is possible to allow the high-performance processor 151 to execute a task which has been executed on the low-power consumption processor 141 by an emulation operation, and perform a high-speed processing, by transferring storage contents in the first cache memory 142 such as the instruction code and the data to the second cache memory 152. There is also proposed a method, wherein data transfer is not performed between the cache memories, based on the premise that an operation of a snoop control circuit to be described later is used.

In the case where the power mode 231 is the high-speed operation mode, and the processor 232 in default, which has been specified by referring to the interruption lookup table 173, is either one of the low-power consumption processor 141 and the high-performance processor 151, the processor 233 to which an interruption is notified by the demultiplexer 174 is identical to the processor in default, and the operation 234 of the interruption time control circuit 172 indicates immediate interruption notification. This means that an interruption notification from the demultiplexer 174 to the processor in default is performed, without performing a delay process by the interruption time control circuit 172.

Referring to FIG. 12, in the case where the power mode 231 is one of the shutdown mode, the standby mode, and the power saving operation mode, even if an interruption received from the interruption controller 161 has been issued to the high-performance processor 151, the demultiplexer 174 switches actual interruption notification from the high-performance processor 151 to the low-power consumption processor 141. This enables to reduce the electric power consumption.

Figure 13:
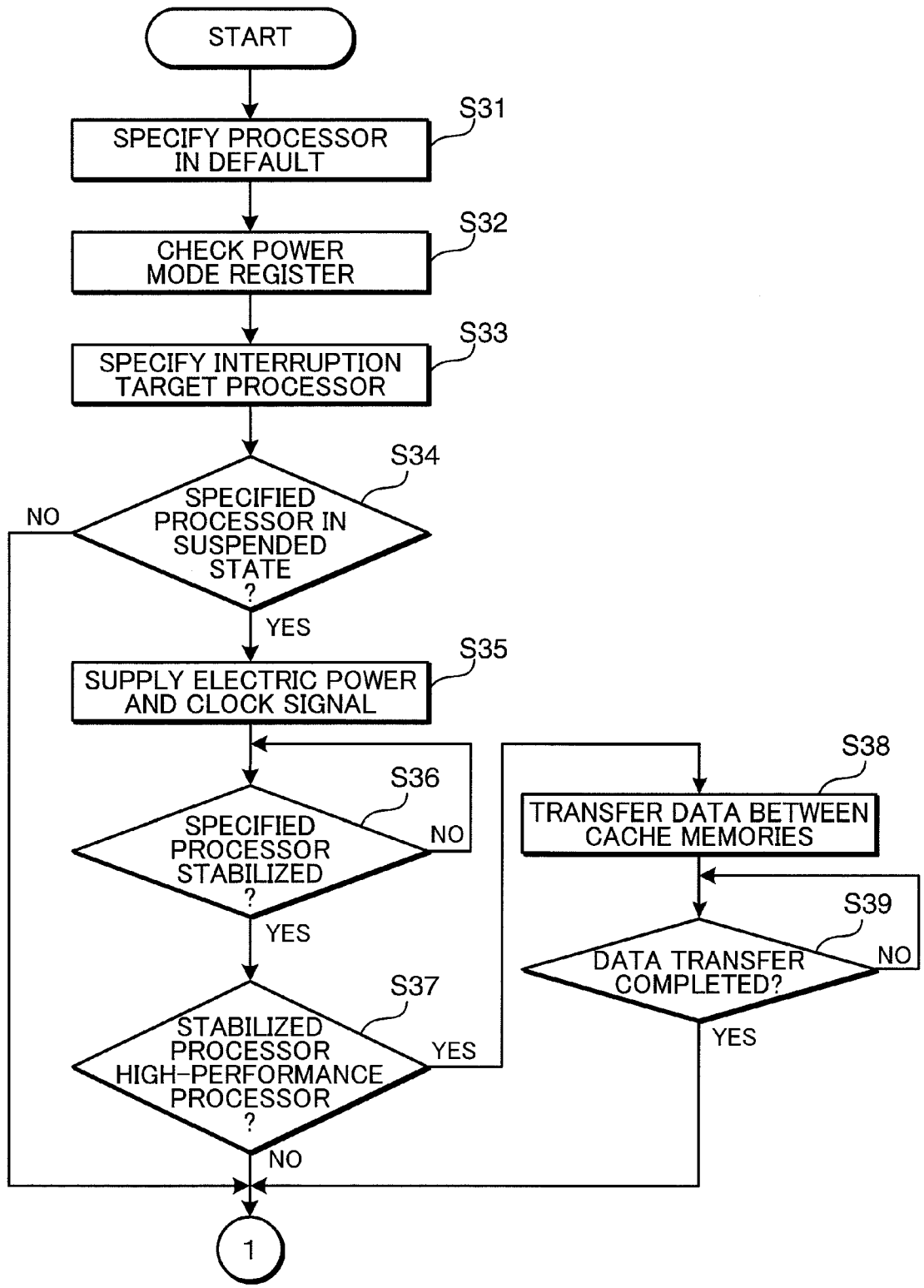
FIG. 13 is a first-half flowchart for describing an example of an operation to be executed by a power control circuit in the third embodiment.
Figure 14:
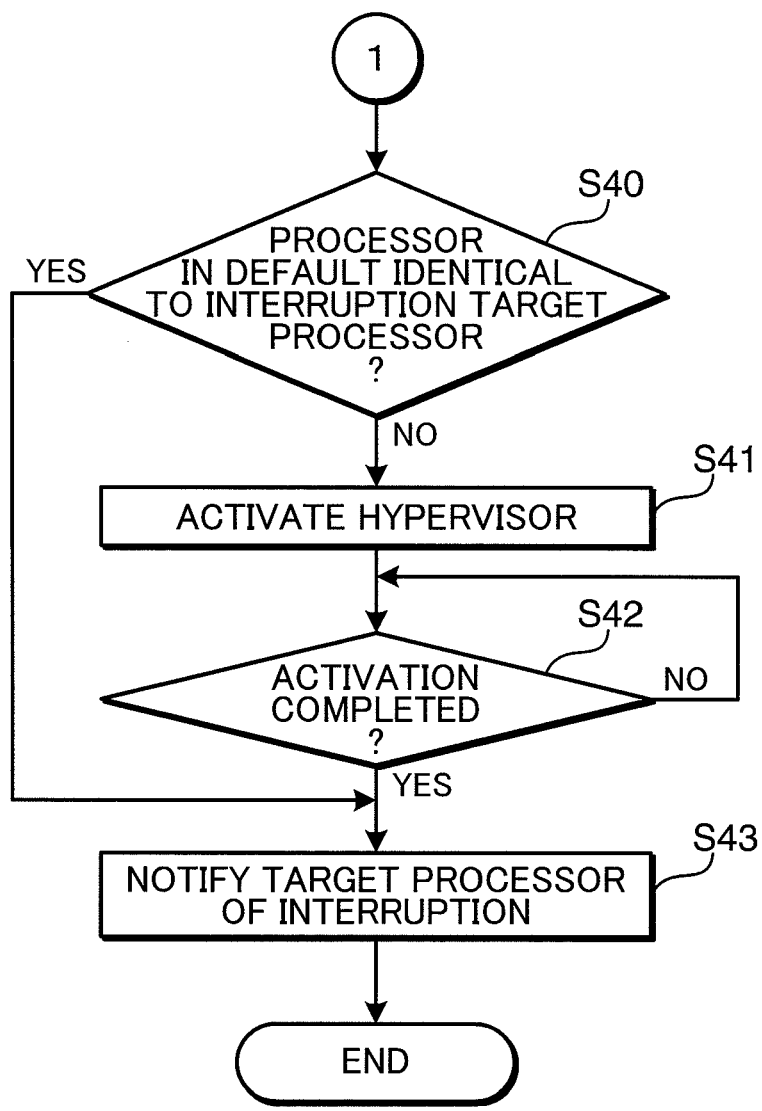
FIG. 14 is a second-half flowchart for describing the example of the operation to be executed by the power control circuit in the third embodiment.

FIGS. 13 and 14 are flowcharts for describing an example of an operation to be executed by the power control circuit 170a in the third embodiment.

The operation shown in FIGS. 13 and 14 may be realized by a program to be run on the microprocessor for power control, which resides on the power control circuit 170a, or may be realized by a hardware configured of a sequential circuit or a logic circuit for realizing the operation shown in FIG. 12.

Upon receiving an interruption from the interruption controller 161 through the signal line 25, the power control circuit 170a specifies a processor to which an interruption set in default is to be notified by referring to the table information (the interruption lookup table 173) shown in FIG. 11 (Step S31).

Then, the power control circuit 170a checks the status of the power mode register 171 (Step S32).

Thereafter, the power control circuit 170a specifies a processor to which the interruption is to be actually notified, based on the processor set in default, and the currently set power mode of the power mode register 171, by referring to the operation lookup table 230 described referring to FIG. 12 (Step S33).

Subsequently, the power control circuit 170a judges whether the processor to which an interruption is to be actually notified in Step S33 is in a suspended state (Step S34). If it is judged that the processor is in a suspended state (YES in Step S34), the routine proceeds to Step S35, and if it is judged that the processor is not in a suspended state (NO in Step S34), the routine proceeds to Step S40.

If it is judged that the specified processor is in a suspended state in Step S34, the power control circuit 170a supplies an electric power and a clock signal to the power block including the specified processor (Step S35). Then, the power control circuit 170a judges whether the specified processor is brought to a stable operation state (Step S36). If it is judged that the specified processor is brought to a stable operation state (YES in Step S36), the routine proceeds to Step S37, and if it is judged that the specified processor is not brought to a stable operation state (NO in Step S36), the routine repeatedly executes the judgment in Step S36 until the specified processor is brought to a stable operation state.

Then, the power control circuit 170a judges whether the processor in a stable operation state is the high-performance processor 151 (Step S37). If it is judged that the stabilized processor is the high-performance processor 151 (YES in Step S37), the routine proceeds to Step S38, and if it is judged that the stabilized processor is not the high-performance processor 151 (NO in Step S37), the routine proceeds to Step S40.

If it is judged that the processor in a stable operation state is the high-performance processor 151 in Step S37, there is a case that the program (instruction code) which should be originally run on the high-performance processor 151 may have been run on the low-power consumption processor 141 by an emulation operation, before the processor is brought to a stable operation state. In view of this, the power control circuit 170a transfers the instruction code to be required by the high-performance processor 151, the data to be referred to by the instruction code, and the execution environment of the second OS 121 which has been run on the low-power consumption processor 141 from the first cache memory 142 to the second cache memory 152, as one of the measures for improving the performance (Step S38).

Then, the power control circuit 170a judges whether the data transfer from the first cache memory 142 to the second cache memory 152 has been completed (Step S39). If it is judged that the data transfer has been completed (YES in Step S39), the routine proceeds to Step S40, and if it is judged that the data transfer has not been completed (NO in Step S39), the routine repeatedly executes the judgment in Step S39 until the data transfer is completed.

Thus, the instruction code and the data to be required by the high-performance processor 151 are stored in advance on the second cache memory 152 to thereby efficiently operate the high-performance processor 151. In this configuration, if a cache miss has occurred in the high-performance processor 151, there is no need of invalidating or updating the instruction code and the data residing on the first cache memory 142 by a snoop operation or a like operation.

Subsequently, the power control circuit 170a judges whether the processor which is specified in default in Step S31, and the processor which is specified to be actually notified in Step S33 are identical to each other (Step S40). If the processor in default and the interruption target processor are identical to each other (YES in Step S40), the routine proceeds to Step S43. If, on the other hand, it is judged that the processor in default and the interruption target processor are not identical to each other (NO in Step S40), the routine proceeds to Step S41.

If it is judged that the processors are not identical to each other in Step S40, the interruption process which has been allocated to the high-performance processor 151 in default is actually allocated to the low-power consumption processor 141. In this case, it is necessary to function particularly the emulation operation of the hypervisor 130. In view of this, the power control circuit 170a activates the hypervisor 130, if the hypervisor 130 is not activated (Step S41).

Subsequently, the power control circuit 170a judges whether activation of the hypervisor 130 has been completed (Step S42). If it is judged that activation of the hypervisor 130 has been completed (YES in Step S42), the routine proceeds to Step S43. If, on the other hand, it is judged that activation of the hypervisor 130 has not been completed (NO in Step S42), the routine repeatedly executes the judgment in Step S42 until activation of the hypervisor 130 is completed.

After the activation of the hypervisor 130 is completed, at a point of time when the hypervisor 130 is operable to function, the power control circuit 170a notifies an interruption to a processor to be notified (Step S43).

Notifying an interruption according to the operation shown in FIGS. 13 and 14 enables to notify the interruption to the low-power consumption processor 141 in the power saving operation mode, and to a target processor corresponding to an interruption request in the high-speed operation mode. Specifically, in the power saving operation mode, it is possible to inhibit interruption notification to the high-performance processor 151. Further, in the standby mode, it is possible to delay interruption notification to a processor, thereby securing more accurate and efficient operations of the hypervisor 130, the first cache memory 142 and the second cache memory 152.

Fourth Embodiment

In the third embodiment, there has been described a method for efficiently utilizing the first cache memory 142 and the second cache memory 152. In the case, however, that plural processors are operated, while sharing a memory, normally, a snoop control is performed between cache memories. The snoop control is a control method for securing consistency of an instruction code and data to be shared between plural processors.

In the snoop control, a writing operation from individual processors into a shared memory is monitored, and if a writing operation into one of the processors is detected, a corresponding entry into a cache memory to be utilized by the other processor is invalidated or updated. Thereby, consistency of an instruction code and data between the cache memories corresponding to plural processors is secured, and logical contradiction can be eliminated.

Figure 15:
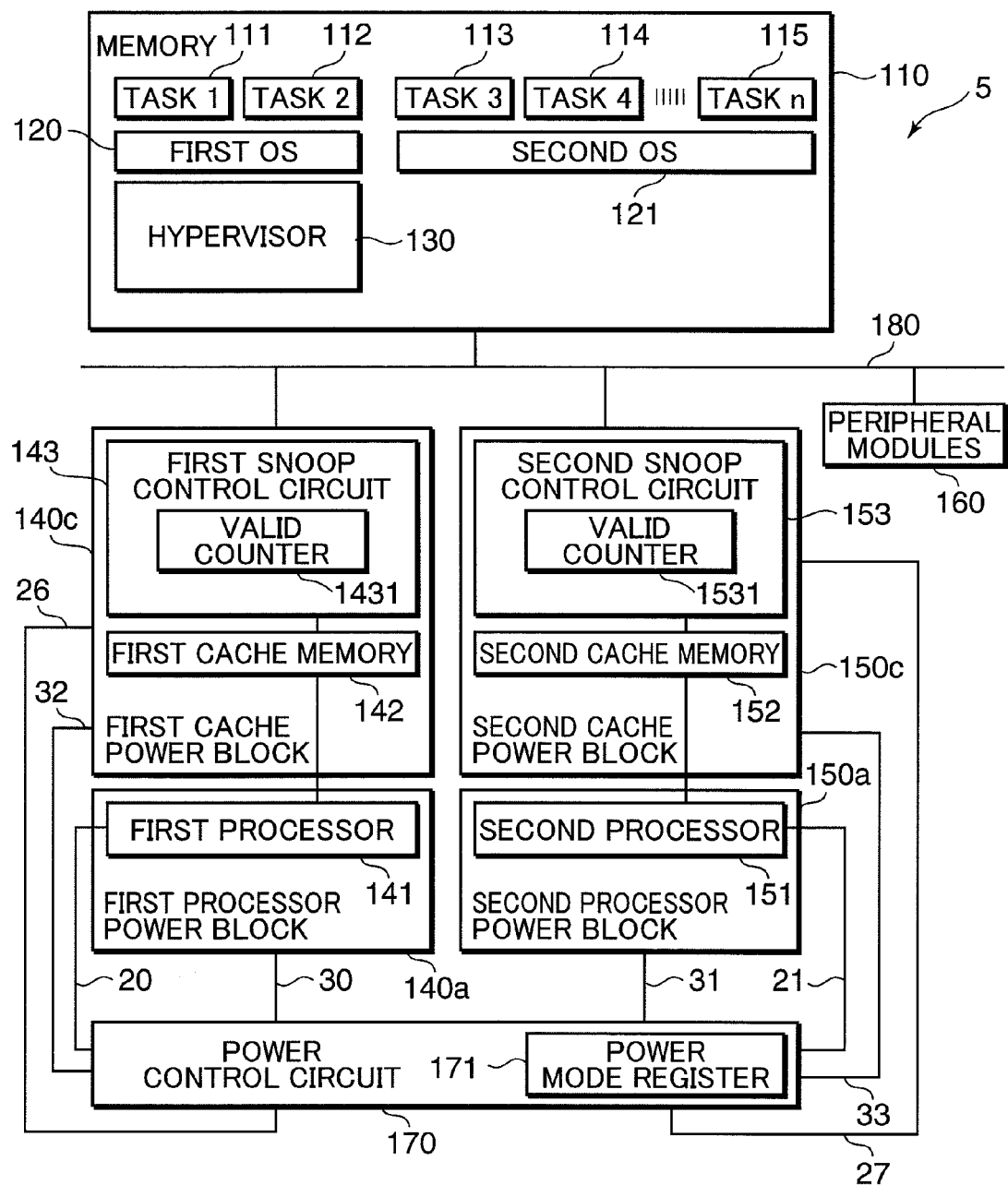
FIG. 15 is a diagram showing an example of a configuration of a multiprocessor system in a fourth embodiment of the invention.

FIG. 15 is a diagram showing an example of a configuration of a multiprocessor system in the fourth embodiment. Referring to FIG. 15, constituent elements having identical reference numerals as those in FIGS. 1, 6 and 7 are constituent elements substantially identical or equivalent to those in FIGS. 1, 6 and 7, and detailed description thereof is omitted herein.

Referring to FIG. 15, the multiprocessor system 5 in the fourth embodiment includes an internal bus 180, a memory 110, a first processor 141, a first cache memory 142, a first snoop control circuit 143, a second processor 151, a second cache memory 152, a second snoop control circuit 153, a power control circuit 170, and peripheral modules 160.

A first processor power block 140a includes the low-power consumption processor 141, and a first cache power block 140c includes the first cache memory 142 and the first snoop control circuit 143. A second processor power block 150a includes the second processor 151, and a second cache power block 150c includes the second cache memory 152 and the second snoop control circuit 153.

Referring to FIG. 15, the first snoop control circuit 143 monitors a writing operation of data from the low-power consumption processor 141 into the first cache memory 142, and requests invalidation or updating of a corresponding entry into the second cache memory 152 upon detecting the writing operation.

The second snoop control circuit 153 monitors a writing operation of data from the high-performance processor 151 into the second cache memory 152, and requests invalidation or updating of a corresponding entry into the first cache memory 142 upon detecting the writing operation.

A general control method of a snoop control circuit is disclosed in e.g. JP Hei 4-191946A.

In the fourth embodiment, the first snoop control circuit 143 has a valid counter 1431, and the second snoop control circuit 153 has a valid counter 1531. The valid counter 1431, 1531 corresponds to an example of a valid data number holding section.

The valid counter 1431 indicates the number of valid data entries, which is stored in the first cache memory 142, and the valid counter 1531 indicates the number of valid data entries, which is stored in the second cache memory 152.

For instance, if a cache miss indicating no data resides on a target cache memory has occurred, the memory 110 accesses to the target data, and the accessed target data is written (loaded) into the target cache memory. A process thereafter is performed, using the data written into the cache memory. This enables to reduce a time required in performing the data access process. In performing this operation, the valid counter 1431, 1531 increments the count value by the number corresponding to the number of effect data newly written into a cache memory.

In the fourth embodiment, description is made as to how the count value of the valid counter 1431, 1531 is changed, as the power mode is changed from the high-speed operation mode to the high-speed standby mode, and then to the power saving operation mode during execution of plural instruction codes included in a task 113.

First, in the case where the power mode is the high-speed operation mode, an instruction code included in the task 113 and a second OS 121 are executed on the high-performance processor 151. When the above operation is executed, the high-performance processor 151 reads data from the memory 110 through the internal bus 180, resulting from execution of the instruction code included in the task 113. When the above operation is executed, the data read from the memory 110 is also written into the second cache memory 152. The count value of the valid counter 1531 is incremented by the number corresponding to the number of the newly read data.

Next, let it be assumed that the power mode is switched to the high-speed standby mode. Then, after execution of the currently executed instruction code is completed by the high-performance processor 151, electric power supply to the high-performance processor 151 is suspended. Out of the plural instruction codes included in the task 113 to be originally executed by the high-performance processor 151, an instruction code succeeding the instruction code, with which the process has been completed by the high-performance processor 151, is executed by the low-power consumption processor 141 by an emulation operation of the hypervisor 130. When the above operation is executed, the low-power consumption processor 141 writes data into the memory 110 through the internal bus 180. When the above operation is executed, there is a likelihood that data before writing into the memory 110 may be stored in the second cache memory 152. In such a case, consistency between newly written data into the memory 110 and data stored in the second cache memory 152 is lost.

In view of the above, the first snoop control circuit 143 monitors a writing operation into the first cache memory 142, and in the case where a writing operation is performed, the first snoop control circuit 143 requests the second cache memory 152 to invalidate or update identical data through the second snoop control circuit 153. As a result of performing the above operation, the number of valid data entries into the second cache memory 152 is reduced. Accordingly, the second snoop control circuit 153 decrements the count value of the valid counter 1531 by the number corresponding to the reduced number of data.

If the number of valid data entries required by the high-performance processor 151 becomes equal to or smaller than a predetermined value, it is less likely that the performance of the system may be degraded resulting from a cache miss at the time of resuming electric power supply, even if electric power supply to the second cache memory 152 corresponding to the high-performance processor 151 is suspended. Accordingly, in the case where the count value of the valid data 1531 becomes equal to or smaller than the predetermined value by operating the first snoop control circuit 143 and the second snoop control circuit 153 as described above, electric power supply to the second cache memory 152 can be suspended by setting the power mode to the power saving operation mode.

The above configuration enables to obtain, from the valid counter 1531, the number of valid data capable of securing consistency between the second cache memory 152 and the memory 110. The method for obtaining, from the valid counter 1431, the number of valid data capable of securing consistency between the first cache memory 142 and the memory 110 is substantially the same as described above.

In the fourth embodiment, the first snoop control circuit 143 periodically checks the value of the valid counter 1431, and the second snoop control circuit 153 periodically checks the value of the valid counter 1531. The first snoop control circuit 143 or the second snoop control circuit 153 transmits, to the power control circuit 170, a command signal indicating suspending supply of an electric power to the target cache power block through a control signal line 26 or 27, as necessary. Upon receiving the command signal, the power control circuit 170 suspends electric power supply to the target cache power block (in this example, the first cache power block 140c or the second cache power block 150c) through an electric power supply line 32 or 33.

The valid counter 1531 holds the number of data capable of securing consistency between data stored in the second cache memory 152 and data stored in the memory 110, and the power control circuit 170 suppresses electric power supply to the second cache memory 152, in the case where the number of data which is held by the valid counter 1531 and is capable of securing consistency becomes equal to or smaller than the predetermined value during a time when electric power supply to the high-performance processor 151 is suspended.

In the case where consistency between data stored in the second cache memory 152, and data stored in the memory 110 is lost, resulting from storing new data generated by execution of the converted instruction code into the memory 110 by the low-power consumption processor 141 during the time when electric power supply to the high-performance processor 151 is suspended by the power control circuit 170, the second snoop control circuit 153 invalidates the data which is stored in the second cache memory 152 and whose consistency is lost.

The multiprocessor system 5 shown in FIG. 15 is operable to automatically suspend electric power supply at a point of time when the number of valid data in a target cache memory becomes smaller than a predetermined value, despite that an electric power is supplied only to the power block including the target cache memory. This is advantageous in further reducing the waste of electric power consumption.

Figure 16:
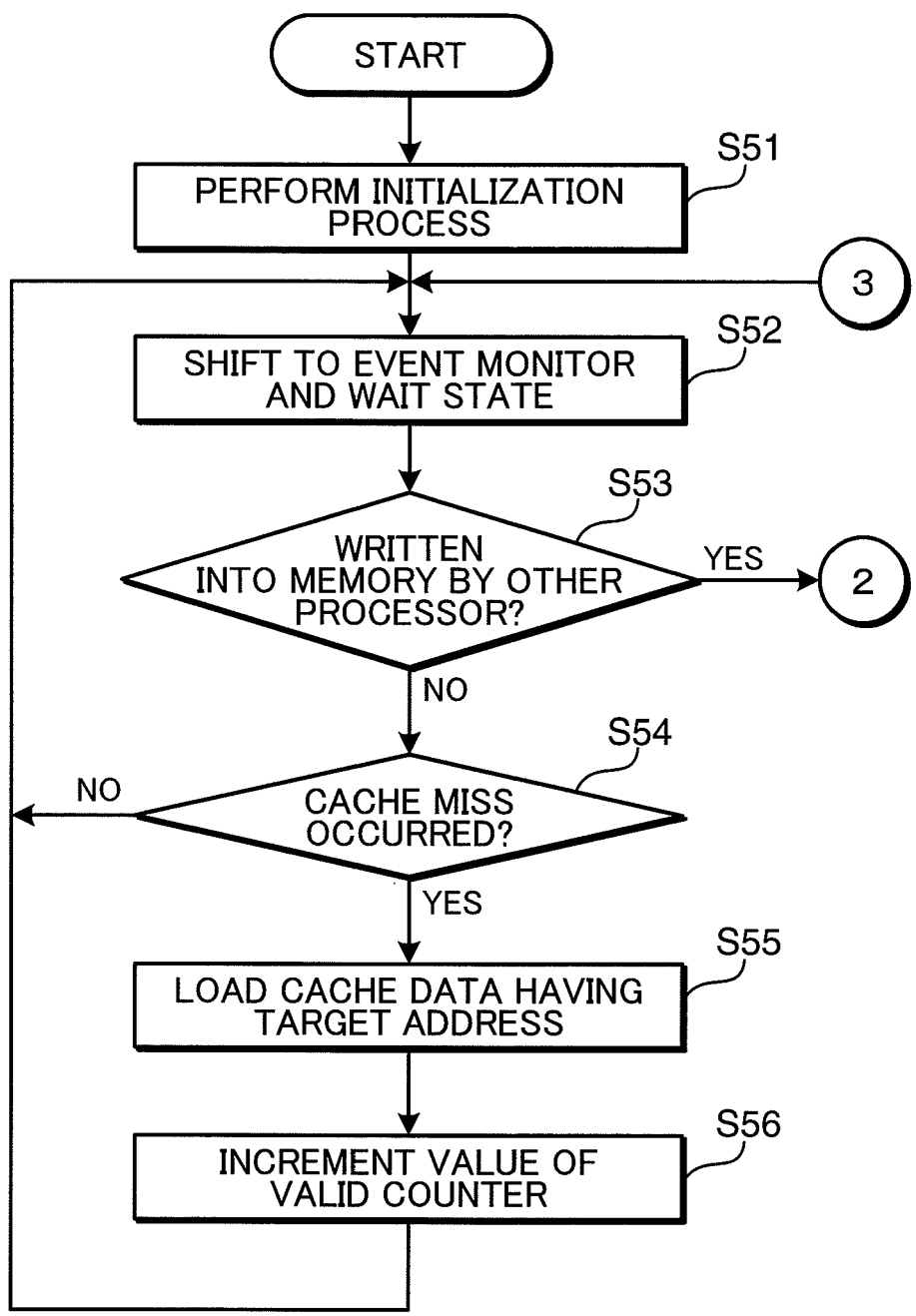
FIG. 16 is a first-half flowchart for describing an example of an operation to be executed by a snoop control circuit in the fourth embodiment.
Figure 17:
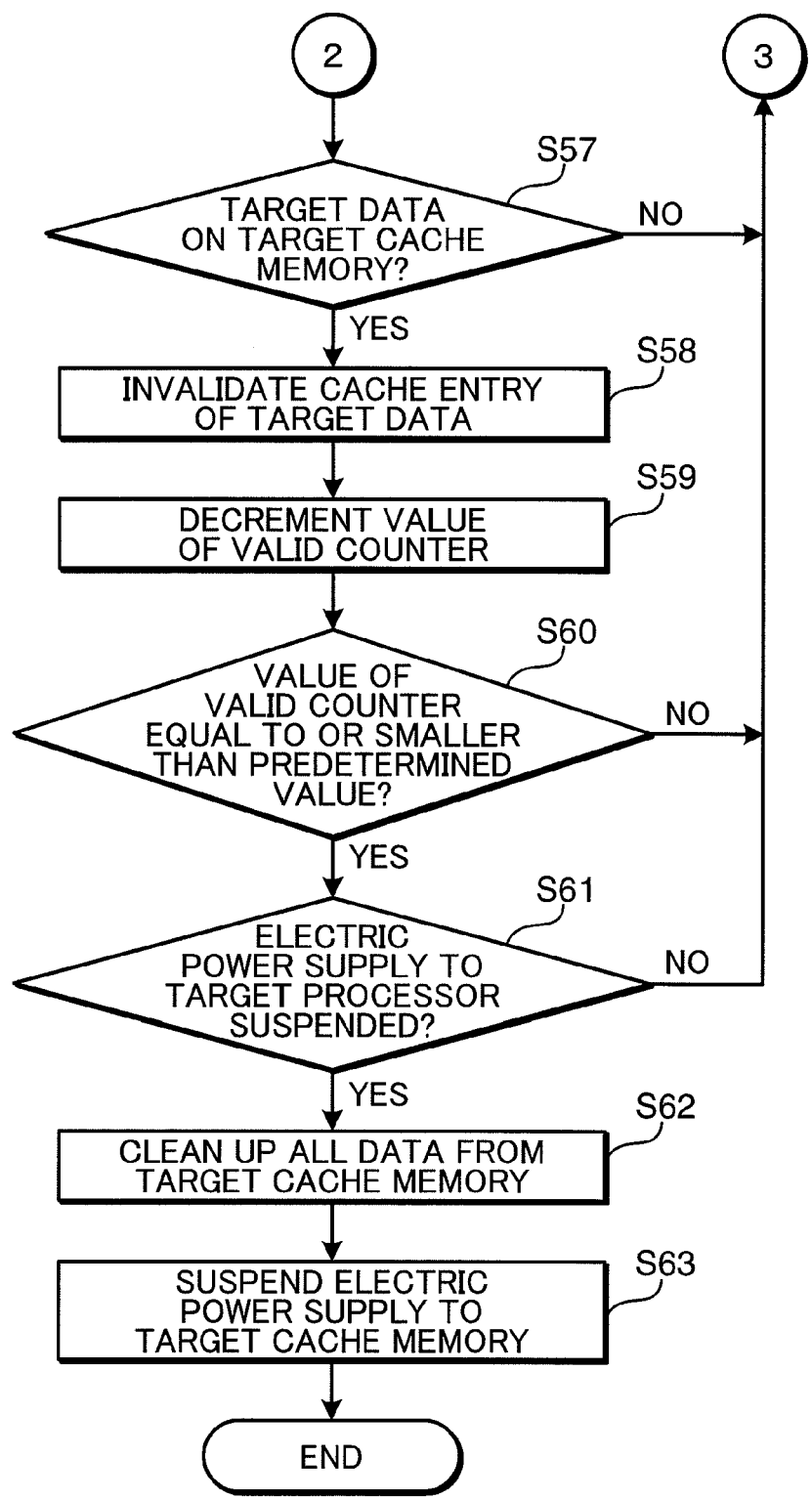
FIG. 17 is a second-half flowchart for describing the example of the operation to be executed by the snoop control circuit in the fourth embodiment.

FIGS. 16 and 17 are a flowchart for describing an example of an operation to be executed by the snoop control circuit (the first snoop control circuit 143 and the second snoop control circuit 153) in the fourth embodiment. The operation shown in FIGS. 16 and 17 may be realized by a program, or realized by a hardware configured of a sequential circuit or a logic circuit.

Upon supply of an electric power to a cache power block including a cache memory to be monitored by a snoop control circuit, the first snoop control circuit 143 or the second snoop control circuit 153 performs a process of initializing the cache memory to be monitored (Step S51). Specifically, upon supply of an electric power to the first cache power block 140c, the first snoop control circuit 143 performs a process of initializing the first cache memory 142 to be monitored. Likewise, upon supply of an electric power to the second cache power block 150c, the second snoop control circuit 153 performs a process of initializing the second cache memory 152 to be monitored. The initialization process includes e.g. invalidating all entries into the cache memory, and zero clear (reset) of the valid counter 1431 (in the case of the second snoop control circuit, the valid counter 1531).

Thereafter, the first snoop control circuit 143 or the second snoop control circuit 153 is shifted to a monitor and wait state of monitoring data transaction into the memory 110 through the internal bus 180, and monitoring data loading into a cache memory resulting from a cache miss. Specifically, the first snoop control circuit 143 or the second snoop control circuit 153 is shifted to an event monitor and wait state of monitoring data writing from the other processor into the memory 110, and monitoring data writing into a cache memory resulting from a cache miss (Step S52).

In the case where an event to be monitored is generated, the first snoop control circuit 143 or the second snoop control circuit 153 judges whether the other processor (hereinafter, called as a counterpart processor) using the cache memory to be monitored by the other snoop control circuit as a counterpart snoop control circuit has written the generated event into the memory 110 through the internal bus 180 (Step S53). Specifically, the first snoop control circuit 143 or the second snoop control circuit 153 judges whether the counterpart processor has written data into the memory 110.

For instance, let it be assumed that a target processor is the high-performance processor 151. In this case, if the low-power consumption processor 141 as the counterpart processor has written data into the memory 110, the first snoop control circuit 143, as the counterpart snoop control circuit, which monitors the transaction, requests invalidation or updating of identical data in the second cache memory 152 through the second snoop control circuit 153. Accordingly, the second snoop control circuit 153 is allowed to check whether the low-power consumption processor 141 has written data into the memory 110 by judging whether invalidation or updating of identical data in the second cache memory 152 has been requested. If it is judged that the counterpart processor has written data into the memory 110 (YES in Step S53), the routine proceeds to Step S57, and if it is judged that the counterpart processor has not written data into the memory 110 (NO in Step S53), the routine proceeds to Step S54.

If it is judged that the counterpart processor has not written data into the memory 110, in other words, the target processor has loaded data into the target cache memory in Step S53, the first snoop control circuit 143 or the second snoop control circuit 153 judges whether a cache miss has occurred in the cache memory to be monitored by the target processor (Step S54). If it is judged that a cache miss has occurred (YES in Step S54), the routine proceeds to Step S55, and if it is judged that a cache miss has not occurred (NO in Step S54), the routine returns to Step S52.

If it is judged that a cache miss has occurred in Step S54, the first snoop control circuit 143 or the second snoop control circuit 153 loads cache data corresponding to a target address from the memory 110 into the cache memory (hereinafter, called as a target cache memory) to be monitored (Step S55).

Then, the first snoop control circuit 143 or the second snoop control circuit 153 increments the value of the valid counter 1431 (in the case of the second snoop control circuit 153, the valid counter 1531) by the number corresponding to the number of valid entries, which has been incremented by loading into the target cache memory (Step S56).

Thereby, the number of entries of data which reside on the target cache memory and whose consistency with data in the memory 110 is secured is stored in the valid counter 1431 (in the case of the second snoop control circuit, the valid counter 1531). Then, after completion of Step S56, the routine returns to Step S52.

If it is judged that the counterpart processor has written data into the memory 110 in Step S53, the first snoop control circuit 143 or the second snoop control circuit 153 judges whether the data written into the memory 110 by the counterpart processor resides on the target cache memory to secure consistency of data on the target cache memory (Step S57). If it is judged that the target data resides on the target cache memory (YES in Step S57), the routine proceeds to Step S58, and if it is judged that the target data does not reside on the target cache memory (NO in Step S57), the routine returns to Step S52.

If it is judged that the target data resides on the target cache memory in Step S57, the first snoop control circuit 143 or the second snoop control circuit 153 invalidates or updates cache entry of the target data (Step S58).

Judgment as to which one of the processes i.e. data invalidation or data updating is to be executed by the first snoop control circuit 143 or the second snoop control circuit 153 in Step S58 normally depends on a data sharing system between plural processors. For instance, if sharing data is processed in parallel by plural processors, an updating system is preferably adopted. If an invalidation system is adopted, a thrashing phenomenon, wherein data is invalidated one from the other, may be generated. On the contrary, in the case where a program running on one of the processors is migrated to the other processor, the invalidation system should be adopted. If the updating system is adopted, useless data always resides on a cache memory from which data is to be migrated. The fourth embodiment is made on the premise that a task is migrated between the low-power consumption processor 141 through the hypervisor 130 and the high-performance processor 151. In view of this, the process flow is described based on the premise that the invalidation system is adopted.

Specifically, in the case where data corresponding to the data written into the memory 110 by the counterpart processor resides on the target cache memory, the first snoop control circuit 143 or the second snoop control circuit 153 invalidates cache entry corresponding to the target data (Step S58).

Then, the first snoop control circuit 143 or the second snoop control circuit 153 decrements the value of the corresponding valid counter by the number corresponding to the number of invalidated entries (Step S59). Although not illustrated, there is a case that cache entry is invalidated by e.g. a cache invalidation instruction, despite that data has not been written into the memory 110 by the counterpart processor. In this case, the first snoop control circuit 143 or the second snoop control circuit 153 also needs to decrement the value of the corresponding valid counter by the number corresponding to the number of invalidated entries.

Subsequently, the first snoop control circuit 143 or the second snoop control circuit 153 judges whether the value of the valid counter is equal to or smaller than a predetermined value (Step S60). If it is judged that the value of the valid counter is equal to or smaller than the predetermined value (YES in Step S60), the routine proceeds to Step S61, and if it is judged that the value of the valid counter is larger than the predetermined value (NO in Step S60), the routine returns to Step S52.

If it is judged that the value of the valid counter is equal to or smaller than the predetermined value in Step S60, the first snoop control circuit 143 or the second snoop control circuit 153 judges whether electric power supply to the target processor is suspended (Step S61). If it is judged that electric power supply to the target processor is suspended (YES in Step S61), the routine proceeds to Step S62, and if it is judged that electric power supply to the target processor is not suspended (NO in Step S61), the routine returns to Step S52.

If it is judged that electric power supply to the target processor is suspended in Step S61, the first snoop control circuit 143 or the second snoop control circuit 153 cleans up (purges) the data from the target cache memory (Step S62).

Subsequently, the first snoop control circuit 143 or the second snoop control circuit 153 transmits, to the power control circuit 170, a command indicating suspending electric power supply to the cache power block including the target cache memory. Upon receiving the command, the power control circuit 170 suspends electric power supply to the target cache power block (Step S63).

Since the multiprocessor system in the fourth embodiment employs the above configuration, the multiprocessor system can automatically suspend electric power supply to a cache power block including a target cache memory, if the number of valid data in the target cache memory becomes smaller than a predetermined value. This enables to further reduce the waste of electric power consumption.

Further, electric power supply is suspended only after the number of valid data entries into a cache memory becomes equal to or smaller than a predetermined value. This enables to reduce an influence resulting from suspending electric power supply to a cache memory, even in the case where a processor utilizing the cache memory to which electric power supply is suspended is re-activated.

Fifth Embodiment

The first through the fourth embodiments have been described based on the premise that an ordinary cache memory is loaded in the low-power consumption processor 141. Generally, it is often the case that a cache memory employs a 2-way to 8-way set-associative cache system. Since the number of data whose addresses are simultaneously compared with each other is limited to two to eight, the above system enables to suppress the electric power consumption and the circuit scale depending on the number of comparators.

Generally, however, the above system has a feature that the electric power consumption in a condition that the system is operated solely by a processor and a cache memory is smaller than in a condition that a cache miss has occurred and data on a memory 110 is accessed to.

A feature of the fifth embodiment resides in providing an arrangement, wherein an increase in the electric power consumption resulting from a cache miss is suppressed.

Figure 18:
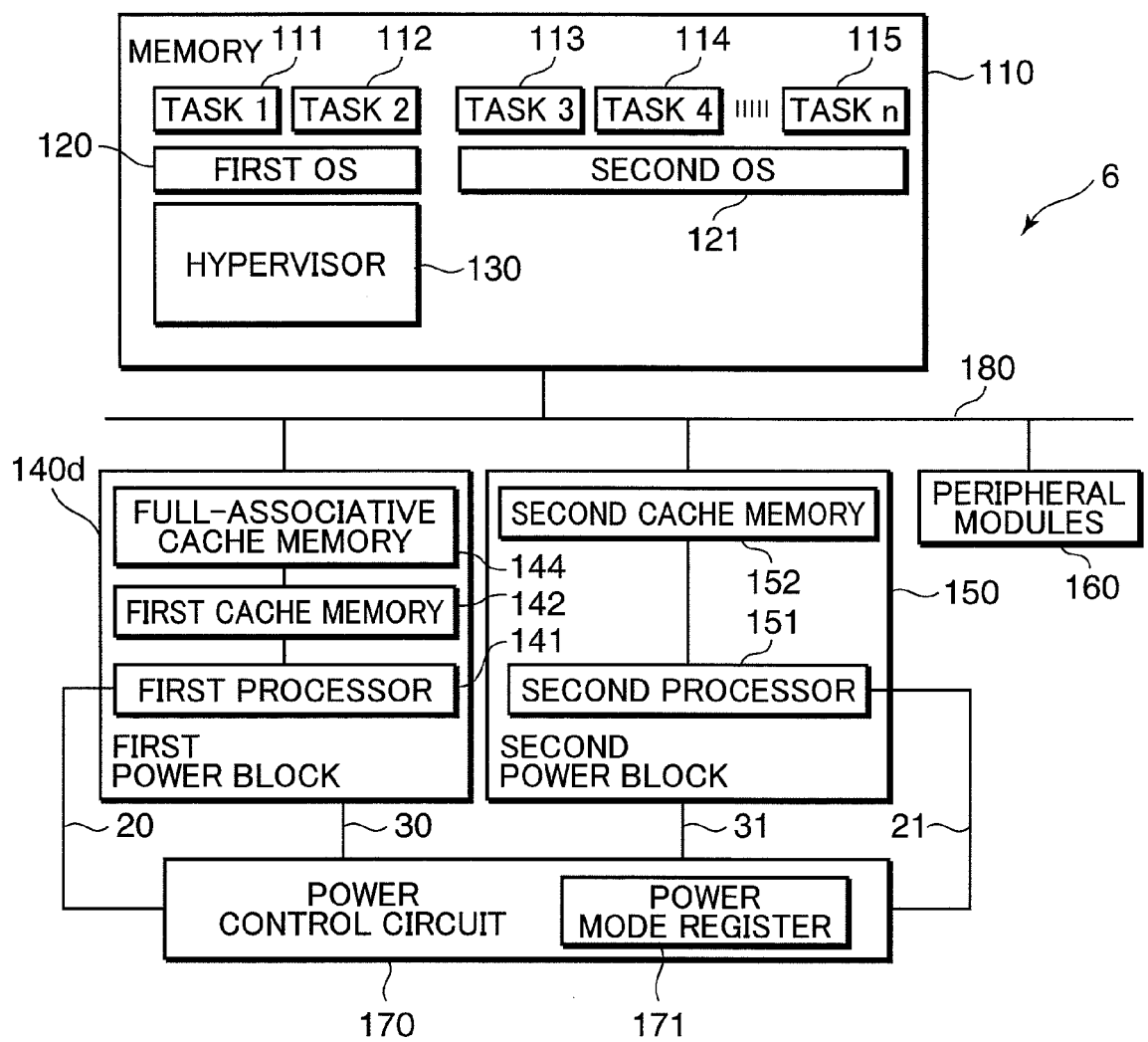
FIG. 18 is a diagram showing an example of a configuration of a multiprocessor system in a fifth embodiment of the invention.

FIG. 18 is a diagram showing an example of a configuration of a multiprocessor system in the fifth embodiment. Referring to FIG. 18, constituent elements having identical reference numerals as those in FIGS. 1 and 6 are constituent elements substantially identical or equivalent to those in FIGS. 1 and 6, and detailed description thereof is omitted herein.

Referring to FIG. 18, the multiprocessor system 6 in the fifth embodiment includes an internal bus 180, a memory 110, a first processor 141, a first cache memory 142, a full-associative cache memory 144, a second processor 151, a second cache memory 152, a power control circuit 170, and peripheral modules 160.

Referring to FIG. 18, a first power block 140d includes the low-power consumption processor 141, the first cache memory 142, and the full-associative cache memory 144 which is described later.

The full-associative cache memory 144 has a function of absorbing a cache miss of the first cache memory 142. The full-associative cache memory 144 stores data which is not utilized in the first cache memory 142 and is discarded, resulting from updating of data in the first cache memory 142. In other words, there is no likelihood that data in the first cache memory 142 and data in the full-associative cache memory 144 may overlap with each other.

The full-associative cache memory 144 stores data which is not identical to the data stored in the first cache memory 142. In the case where data stored in the first cache memory 142 is updated by the low-power consumption processor 141, and data which is not utilized in the first cache memory 142 is discarded therefrom by the low-power consumption processor 141, the full-associative cache memory 144 stores the data discarded from the first cache memory 142.

The full-associative cache memory 144 has a function of comparing an address to which an access request has been performed, with all the entries in the full-associative cache memory 144.

The function of comparing with all the entries is not realized by providing comparators of the number corresponding to the number of entries in the first cache memory 142. Since the low-power consumption processor 141 is allowed to operate at a low speed and with a low electric power consumption, a single comparator may be used and configured to sequentially check matching with all the entries in the first cache memory 142. The details on the full-associative cache memory 144 will be described referring to FIG. 19.

By adopting the fifth embodiment shown in FIG. 18, the full-associative cache memory 144 can absorb data, to which an access has been failed, and which has been discarded from the first cache memory 142 immediately before generation of a cache miss. This enables to reduce the number of accesses to the memory 110, and accordingly, enables to further reduce the electric power consumption in the power saving operation mode.

Figure 19:
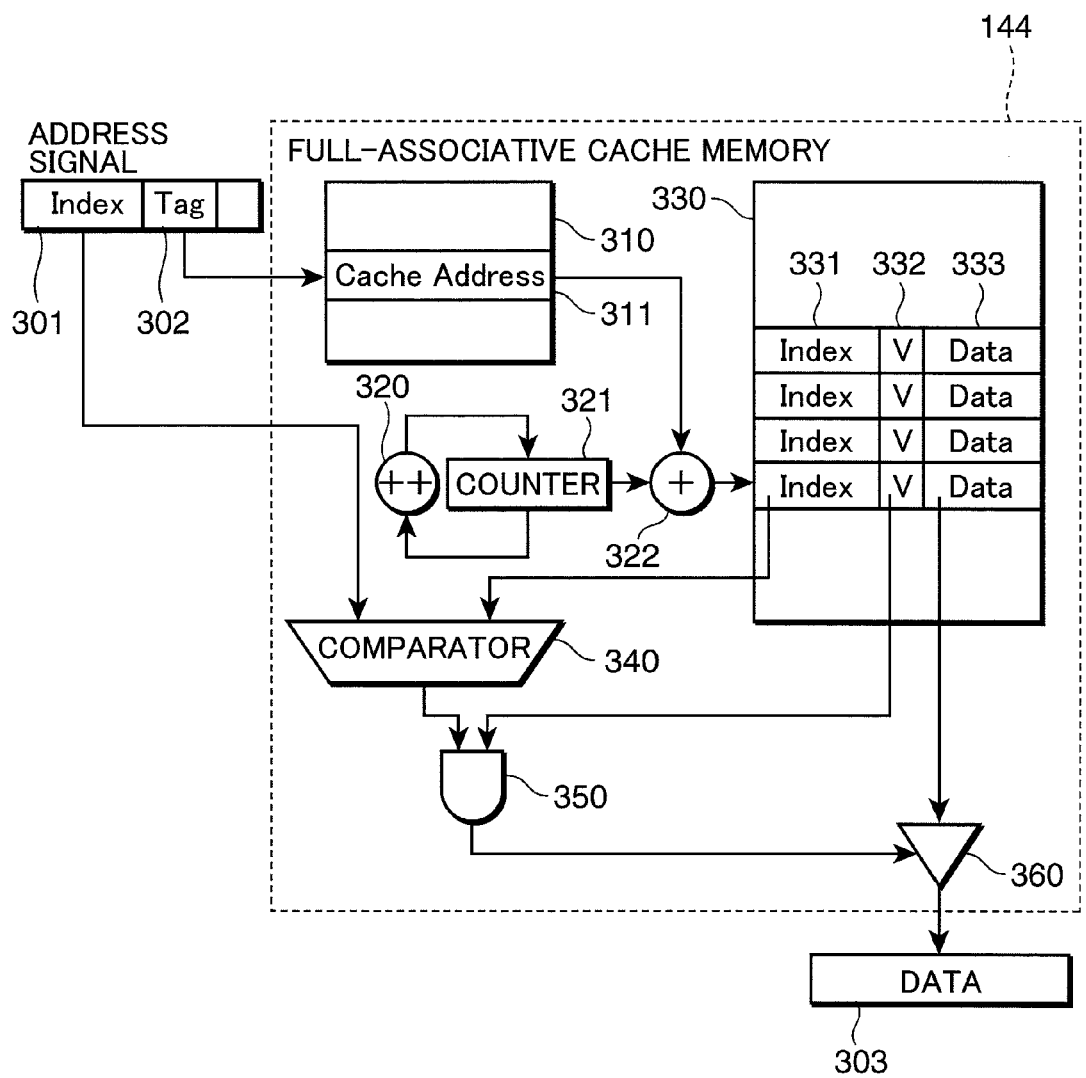
FIG. 19 is a diagram showing an example of a concrete configuration of a full-associative cashe memory in the fifth embodiment.

FIG. 19 is a diagram showing a concrete example of the full-associative cache memory 144 in the fifth embodiment. FIG. 19 schematically shows an example of a circuit configuration for performing a series of operations comprising inputting an address signal composed of an index value 301 and a tag value 302 to the full-associative cache memory 144, and outputting data 303 corresponding to the inputted address signal.

In FIG. 19, a load-store circuit, which is connected to the memory 110 and is operated in a condition that there is no data on the full-associative cache memory 144, is not illustrated. A data memory 330 corresponding to the main body of the full-associative cache memory 144 stores data therein. The data stored in the data memory 330 includes index values 331, valid bits 332, and data bodies 333.

Dirty bits (bits indicating whether data is overwritten on the first cache memory 142, in other words, bits indicating that data should be finally written back to the memory 110), and sharing bits (bits indicating that data is shared with the other processor and peripheral modules) may be provided, in addition to the illustrated data.

A hash table 310 corresponds to a conversion table indicating address hint of data in the data memory 330 in the full-associative cache memory 144 based on the tag value. The hash table 310 is constituted of data arrays, for instance.

The full-associative cache memory 144 shown in FIG. 19 at first obtains an address 311 of the data memory 330 by referring to the hash table 310, using the tag value 302 as a key. Specifically, the full-associative cache memory 144 obtains the address 311 of the data memory 330 by extracting data of a number indicated by the tag value 302 from the hash table 310. However, unlike a set-associative system, in the full-associative system, it is not always the case that the address 311 designates an intended cache entry. In view of this, the full-associative cache memory 144 has a counter 321 having zero as an initial value. The full-associative cache memory 144 checks entries corresponding to a summation result of the counter 321 and the address 311 by an adder 322, while incrementing the count value of the counter 321 by an incrementer 320. The full-associative cache memory 144 terminates the count-up at a point of time when there is no valid entries, and the condition is defined as a cache miss.

In the case where the index value 331 of a target entry in the data memory 330 in the full-associative cache memory 144, and the index value 301 in the address signal coincide with each other, and the valid bit 332 is "Valid", the condition is defined as a cache hit. On the circuit configuration, a comparator 340 compares the index values with each other, and an AND circuit 350 judges whether the valid bit is valid or not. To simplify the description on FIG. 19, the output from the comparator 340 is inputted to the AND circuit 350. However, controlling the comparator 340 to implement the computation after the judgment whether the valid bit 332 is valid may be advantageous in avoiding a useless operation of the comparator 340, and reducing the electric power consumption. If a cache hit is detected, a gate 360 outputs the target data body 333 stored in the data memory 330, as an output data value 303.

Then, for instance, a process using the output data value 303 is performed by the low-power consumption processor 141, and the output data value 303 is written into the first cache memory 142. In performing these operations, the data in the full-associative cache memory 144 which has been used in writing into the first cache memory 142 is deleted from the data memory 330. This enables to avoid a likelihood that identical data may be stored in the first cache memory 142 and the full-associative cache memory 144 (specifically, the data memory 330), and effectively utilize the limited capacities of the first cache memory 142 and the full-associative cache memory 144.

In the fifth embodiment, providing the full-associative cache memory 144 with the single comparator 340 shown in FIG. 19 enables to load a cache memory capable of maximally suppressing generation of a cache miss, without seriously increasing the electric power consumption. Suppressing generation of a cache miss enables to suppress an increase in the electric power consumption resulting from accessing to the memory 110. This is advantageous in further reducing the electric power consumption of the multiprocessor system 6 as a whole.

The foregoing embodiments and modifications mainly include the features having the following arrangements.

A multiprocessor control apparatus according to an aspect of the invention includes: a first processor which executes a first instruction code; a second processor which executes a second instruction code different from the first instruction code; an instruction converting section which converts the second instruction code into an instruction code executable by the first processor; and a control section which controls an operation of at least one of the first processor and the second processor, wherein the instruction converting section converts the second instruction code into an instruction code executable by the first processor, in the case where the operation of the second processor is suppressed by the control section, and the first processor executes the converted instruction code.

A multiprocessor control method according to another aspect of the invention is a multiprocessor control method for controlling a first processor which executes a first instruction code, and a second processor which executes a second instruction code different from the first instruction code. The multiprocessor control method includes: a control step of controlling an operation of at least one of the first processor and the second processor; an instruction converting step of converting the second instruction code into an instruction code executable by the first processor, in the case where the operation of the second processor is suppressed in the control step; and an executing step of executing the instruction code converted in the instruction converting step by the first processor.

A multiprocessor control circuit according to yet another aspect of the invention is a multiprocessor control circuit for controlling a first processor which executes a first instruction code, and a second processor which executes a second instruction code different from the first instruction code. The multiprocessor control circuit includes: an instruction converting circuit which converts the second instruction code into an instruction code executable by the first processor; and a control circuit which controls an operation of at least one of the first processor and the second processor, wherein the instruction converting circuit converts the second instruction code into an instruction code executable by the first processor, in the case where the operation of the second processor is suppressed by the control circuit, and the first processor executes the converted instruction code.

According to the above arrangements, even if the second instruction code to be run on the second processor is fetched during a time when the operation of the second processor is suppressed, the second instruction code can be converted into the instruction code executable by the first processor, and the converted instruction code can be run on the first processor, without activating the second processor.

The above arrangements enable to reduce the number of times of temporarily activating the second processor during the time when the operation of the second processor is suppressed, and reduce the electric power consumption resulting from temporarily activating a processor requiring a large electric power consumption, out of a plurality of processors.

In the multiprocessor control apparatus, preferably, the control section may include an electric power control section which controls an electric power to be supplied to the second processor, the instruction converting section may convert the second instruction code into the instruction code executable by the first processor, in the case where the supply of the electric power to the second processor is suppressed by the electric power control section, and the first processor may execute the converted instruction code.

According to the above arrangement, even if the second instruction code to be run on the second processor is fetched during a time when the supply of the electric power to the second processor is suppressed, the second instruction code can be converted into the instruction code executable by the first processor, and the converted instruction code can be run on the first processor, without activating the second processor.

The above arrangement enables to reduce the number of times of temporarily activating the second processor during the time when the supply of the electric power to the second processor is suppressed, and reduce the electric power consumption resulting from temporarily activating a processor requiring a large electric power consumption, out of a plurality of processors.

In the multiprocessor control apparatus, preferably, an electric power to be consumed by the first processor may be smaller than the electric power to be consumed by the second processor.

According to the above arrangement, since the converted instruction code is executed by the first processor during a time when the supply of the electric power to the second processor is suppressed, the electric power consumption can be reduced, as compared with a case of executing the second instruction code by the second processor.

In the multiprocessor control apparatus, preferably, the electric power control section may suspend the supply of the electric power to the second processor, and the instruction converting section may convert the second instruction code into the instruction code executable by the first processor, in the case where the supply of the electric power to the second processor is suspended by the electric power control section.

According to the above arrangement, since the supply of the electric power to the second processor is suspended, the electric power consumption can be further reduced.

In the multiprocessor control apparatus, preferably, the electric power control section may notify the first processor of a request of an interruption process, upon receiving the notification requesting the interruption process to the second processor during a time when the supply of the electric power to the second processor is suppressed, and the instruction converting section may convert the second instruction code corresponding to the interruption process notified by the electric power control section.

According to the above arrangement, even in the case where notification requesting an interruption process to the second processor is received during a time when the supply of the electric power to the second processor is suppressed, the number of times of temporarily activating the second processor can be reduced, and the electric power consumption can be reduced, as compared with a case of performing an interruption process by the second processor.

Preferably, the multiprocessor control apparatus may further include a memory which stores the first instruction code and the second instruction code, wherein the first processor executes the first instruction code stored in the memory, and the second processor executes the second instruction code stored in the memory.

According to the above arrangement, since the second instruction code stored in the memory is converted into the instruction code executable by the first processor during a time when the supply of the electric power to the second processor is suppressed, the first processor can execute the converted instruction code.

Preferably, the multiprocessor control apparatus may further include a conversion table holding section which holds a conversion table for use in converting the second instruction code into the instruction code executable by the first processor, wherein the instruction converting section converts the second instruction code into the instruction code executable by the first processor, based on the conversion table held in the conversion table holding section.

According to the above arrangement, since the second instruction code is converted into the instruction code executable by the first processor based on the conversion table, the second instruction code can be easily converted into the instruction code executable by the first processor.

In the multiprocessor control apparatus, preferably, the first processor may store, into the memory, first data to be generated by executing one of the first instruction code and the converted instruction code, and the second processor may store, into the memory, second data to be generated by executing the second instruction code.

According to the above arrangement, the first data to be generated by executing one of the first instruction code and the converted instruction code is stored into the memory by the first processor, and the second data to be generated by executing the second instruction code is stored into the memory by the second processor. This enables to use the data to be generated by execution of the instruction code by the first processor or the second processor in executing a succeeding instruction code.

Preferably, the multiprocessor control apparatus may further include a first cache memory; and a second cache memory, wherein the first processor stores, into the first cache memory, new data to be generated by executing the first instruction code, using the first data stored in the memory, and stores, into the first cache memory, new data to be generated by executing the converted instruction code, using the second data stored in the memory, and the second processor stores, into the second cache memory, new data to be generated by executing the second instruction code, using the second data stored in the memory.

According to the above arrangement, the new data to be generated by executing the first instruction code is stored into the first cache memory, the new data to be generated by executing the converted instruction code, using the second data, is stored into the first cache memory, and the new data to be generated by executing the second instruction code is stored into the second cache memory. Thus, since the first processor accesses to the first cache memory, and the second processor accesses to the second cache memory, a high-speed accessing operation can be performed, as compared with a case of accessing to a memory.

Preferably, the multiprocessor control apparatus may further include a valid data number holding section which holds the number of data capable of securing consistency between the data stored in the second cache memory, and the data stored in the memory, wherein the electric power control section suppresses the supply of the electric power to the second cache memory, in the case where the number of data which is held in the valid data number holding section, and whose consistency is secured is equal to or smaller than a predetermined value during a time when the supply of the electric power to the second processor is suppressed.

According to the above arrangement, even in the case where the second processor utilizing the second cache memory to which the electric power supply has been suppressed is re-activated, there can be reduced an influence resulting from suppressing the electric power supply to the second cache memory.

In the multiprocessor control apparatus, in the case where the consistency between the data stored in the second cache memory, and the data stored in the memory is lost, resulting from storing of new data to be generated by executing the converted instruction code into the memory by the first processor during a time when the supply of the electric power to the second processor is suppressed, preferably the second processor invalidates the data which is stored in the second cache memory and whose consistency is lost.

According to the above arrangement, even in the case where the second processor to which the electric power supply has been suppressed is re-activated, the second processor is allowed to utilize solely the data whose consistency with the data stored in the memory is secured, out of the data stored in the second cache memory. This enables to eliminate the need of a process for invalidating the second cache memory by the second processor after the reactivation.

Preferably, the multiprocessor control apparatus may further include a full-associative cache memory which stores data which is not identical to the data stored in the first cache memory, wherein in the case where the data stored into the first cache memory is updated by the first processor, and the data which is not utilized in the first cache memory is discarded from the first cache memory by the first processor, the full-associative cache memory stores the data discarded from the first cache memory.

According to the above arrangement, it is possible to extract, from the full-associative cache memory, the data which has been discarded immediately before generation of a cache miss, even if the cache miss is generated in the first cache memory. This enables to complement the cache miss in the first cache memory. In other words, as far as the capacity of the discarded data is within the capacity of the first cache memory or the full-associative cache memory, there is no need of accessing to the memory, thereby further reducing the electric power consumption.

In the multiprocessor control apparatus, preferably, the control section may control as to whether a clock signal is to be supplied to the second processor, and the instruction converting section may convert the second instruction code into the instruction code executable by the first processor, in the case where the supply of the clock signal to the second processor is suspended by the control section.

According to the above arrangement, even in the case where the second instruction code to be run on the second processor is fetched during a time when the supply of the clock signal to the second processor is suspended, the second instruction code can be converted into the instruction code executable by the first processor, and the converted instruction code can be run on the first processor, without operating the second processor.

The above arrangement enables to reduce the number of times of temporarily operating the second processor during the time when the supply of the clock signal to the second processor is suspended, and reduce the electric power consumption resulting from temporarily operating a processor requiring a large electric power consumption, out of a plurality of processors.

In the multiprocessor control apparatus, preferably, the control section may control as to whether the second processor is to be operated or waited, and the instruction converting section may convert the second instruction code into the instruction code executable by the first processor, in the case where the second processor is waited by the control section.

According to the above arrangement, even in the case where the second instruction code to be run on the second processor is fetched during a time when the second processor is in a standby state, the second instruction code can be converted into the instruction code executable by the first processor, and the converted instruction code can be run on the first processor, while keeping the second processor in a standby state.

The above arrangement enables to reduce the number of times of temporarily operating the second processor while the second processor is kept in a standby state, and reduce the electric power consumption resulting from temporarily operating a processor requiring a large electric power consumption, out of a plurality of processors.

INDUSTRIAL APPLICABILITY

A multiprocessor control apparatus, a multiprocessor control method, and a multiprocessor control circuit according to the invention are applicable to a device for controlling an operation of at least one of a first processor and a second processor depending on e.g. a use state of the user, e.g. a mobile device such as a mobile phone, and an embedded device such as a home information appliance.

More specifically, while a mobile phone is in a call wait state, or a home information appliance is in a standby state, only a processor requiring a small electric power consumption is operated to suppress the electric power of a processor requiring a large electric power consumption, while e.g. waiting for a user's manipulation and monitoring a radio receiving state. On the other hand, while the mobile phone or the home information appliance is manipulated by the user, e.g. a browsing operation or a moving image display operation is performed, it is required to execute a high-performance processor. Accordingly, a processor requiring a small electric power consumption, and a processor requiring a large electric power consumption are operated in parallel. The multiprocessor control apparatus, the multiprocessor control method, and the multiprocessor control circuit according to the invention are suitably adapted to a mobile phone and an embedded device which perform the electric power control as described above.

The invention claimed is:

1. A multiprocessor control apparatus comprising:
   a first processor which executes a first instruction code;
   a second processor which executes a second instruction code, the second processor being different from the first processor;
   an instruction converting section which converts the second instruction code into the first instruction code executable by the first processor;
   a control section which switches between a first mode for operating the first processor and the second processor and a second mode for suppressing an operation of the second processor compared to an operation of the first processor; and
   a hypervisor which chooses which one of a first program group constituted of the first instruction code, and a second program group constituted of the second instruction code is to be executed,
   wherein, in the first mode, the first processor executes the first program group constituted of the first instruction code, and the second processor executes the second program group constituted of the second instruction code independently from the first processor, and
   wherein, in the second mode, the hypervisor converts the second instruction code in the second program group into the first instruction code executable by the first processor, using the instruction converting section, and allows the first processor to execute the first instruction code converted from the second instruction code and the first instruction code in the first program group in parallel in a time-sharing manner.

2. The multiprocessor control apparatus according to claim 1, wherein the control section includes an electric power control section which suppresses the operation of the second processor by controlling an electric power to be supplied to the second processor.

3. The multiprocessor control apparatus according to claim 2, wherein an electric power to be consumed by the first processor is smaller than the electric power to be consumed by the second processor.

4. The multiprocessor control apparatus according to claim 2, wherein
   the electric power control section suppresses the operation of the second processor by suspending the supply of the electric power to the second processor.

5. The multiprocessor control apparatus according to claim 2, wherein
   the electric power control section notifies the first processor of a request of an interruption process, upon receiving a notification requesting the interruption process to the second processor during a time when the supply of the electric power to the second processor is suppressed, and
   the instruction converting section converts the second instruction code corresponding to the interruption process notified by the electric power control section.

6. The multiprocessor control apparatus according to claim 2, further comprising a memory which stores the first instruction code and the second instruction code, wherein the first processor executes the first instruction code stored in the memory, and the second processor executes the second instruction code stored in the memory.

7. The multiprocessor control apparatus according to claim 6, further comprising a conversion table holding section which holds a conversion table for use in converting the second instruction code into the first instruction code executable by the first processor, wherein the instruction converting section converts the second instruction code into the first instruction code executable by the first processor, based on the conversion table held in the conversion table holding section.

8. The multiprocessor control apparatus according to claim 2, further comprising:

a memory for storing first data generated by the first processor executing one of the first instruction code and the converted instruction code; and a cache memory for storing second data generated by the second processor executing the second instruction code; and an effective data number holding section which holds a number of data capable of securing consistency between the second data stored in the cache memory and the first data stored in the memory, wherein the control section suppresses an operation of the cache memory by controlling an electric power to be supplied to the cache memory, and the control section suppresses the supply of the electric power to the cache memory, when the number of data held in the effective data number holding section and capable of securing consistency is equal to or smaller than a predetermined value during a time when the supply of the electric power to the second processor is suppressed.

9. The multiprocessor control apparatus according to claim 1, wherein the control section suppresses the operation of the second processor by controlling as to whether a clock signal is to be supplied to the second processor.

10. The multiprocessor control apparatus according to claim 1, wherein the control section suppresses the operation of the second processor by controlling as to whether the second processor is to be operated or waited.

11. A multiprocessor control method for controlling a first processor which executes a first instruction code, and a second processor which executes a second instruction code, the second processor being different from the first processor, the multiprocessor control method comprising:

a control step of switching between a first mode for operating the first processor and the second processor and a second mode for suppressing an operation of the second processor compared to an operation of the first processor;

a choosing step of choosing which one of a first program group constituted of the first instruction code, and a second program group constituted of the second instruction code is to be executed;

a first executing step of allowing, in the first mode, the first processor to execute the first program group constituted of the first instruction code, and the second processor to execute the second program group constituted of the second instruction code independently from the first processor; and a second executing step of converting, in the second mode, the second instruction code in the second program group into the first instruction code executable by the first processor, and allowing the first processor to execute the first instruction code converted from the second instruction code and the first instruction code in the first program group in parallel in a time-sharing manner.

12. A multiprocessor control circuit for controlling a first processor which executes a first instruction code, and a second processor which executes a second instruction code, the second processor being different from the first processor, the multiprocessor control circuit comprising:

an instruction converting circuit which converts the second instruction code into the first instruction code executable by the first processor;

a control circuit which switches between a first mode for operating the first processor and the second processor and a second mode for suppressing an operation of the second processor compared to an operation of the first processor; and a hypervisor which chooses which one of a first program group constituted of the first instruction code, and a second program group constituted of the second instruction code is to be executed, wherein, in the first mode, the first processor executes the first program group constituted of the first instruction code, and the second processor executes the second program group constituted of the second instruction code independently from the first processor, and wherein, in the second mode, the hypervisor converts the second instruction code in the second program group into the first instruction code executable by the first processor, using the instruction converting circuit, and allows the first processor to execute the first instruction code converted from the second instruction code and the first instruction code in the first program group in parallel in a time-sharing manner.

13. A multiprocessor control apparatus comprising:

a first processor which executes a first instruction code;

a second processor which executes a second instruction code and is capable individually executing user interface processing, the second processor being different from the first processor;

an instruction converting section which converts the second instruction code into the first instruction code executable by the first processor;

a control section which controls an operation of at least the second processor out of the first processor and the second processor; and a hypervisor which chooses which one of a first program group constituted of the first instruction code and a second program group constituted of the second instruction code is to be executed, wherein the hypervisor which, when the second program group is being executed, and when having received an access violation exception of a second instruction code area generated by the controller section suppressing the operation of the second processor, converts the second instruction code in the second program group into the first instruction code executable by the first processor using the instruction converting section, and allows the first processor to execute the first instruction code converted from the second instruction code and the first instruction code in the first program group in parallel in a time-sharing manner.

* * * * *